(12) United States Patent
Aharoni

(10) Patent No.: US 12,329,075 B2
(45) Date of Patent: Jun. 17, 2025

(54) PLANT POT

(71) Applicant: Mixtiles Ltd., Tel Aviv (IL)

(72) Inventor: Lior Aharoni, Tel Aviv (IL)

(*) Notice: Subject to any disclaimer, the term of this patent is extended or adjusted under 35 U.S.C. 154(b) by 0 days.

(21) Appl. No.: 18/280,833

(22) PCT Filed: Mar. 10, 2022

(86) PCT No.: PCT/IL2022/050272
§ 371 (c)(1),
(2) Date: Sep. 7, 2023

(87) PCT Pub. No.: WO2022/190103
PCT Pub. Date: Sep. 15, 2022

(65) Prior Publication Data
US 2024/0138325 A1   May 2, 2024

Related U.S. Application Data

(60) Provisional application No. 63/159,531, filed on Mar. 11, 2021.

(51) Int. Cl.
*A01G 27/02* (2006.01)
*A01G 9/02* (2018.01)

(52) U.S. Cl.
CPC .............. *A01G 27/02* (2013.01); *A01G 9/028* (2013.01)

(58) Field of Classification Search
CPC ........ A01G 27/02; A01G 9/028; A01G 27/04; A01G 27/06
See application file for complete search history.

(56) References Cited

U.S. PATENT DOCUMENTS 3,192,665 A    7/1965  Cloud
5,502,924 A *  4/1996  Lee .................. A01G 27/02
                                                    47/79
(Continued)

FOREIGN PATENT DOCUMENTS

CH          610716 A5    5/1979
CN       201252752 Y    6/2009
(Continued)

OTHER PUBLICATIONS

International Search Report and Written Opinion for International Application No. PCT/IL2022/050272 mailed Aug. 19, 2022.

*Primary Examiner* — Trinh T Nguyen
(74) *Attorney, Agent, or Firm* — Dorsey & Whitney LLP

(57) ABSTRACT

A capillary irrigation pot system (20), comprising a pot housing (22), a pot liner (24) configurable for receiving within said pot housing (22), wherein once received within the pot housing (22) gives rise to an irrigation liquid reservoir extending between an inside wall surface of the pot housing (22) and an outside wall surface of the pot liner (24), and a capillary assembly (100) comprising a capillary media (106) received within a substantially liquid impermeable sheathe (108), where a first end of the capillary media (106) projecting from a first end of the sheath (108) extends at a bottom portion of the irrigation liquid reservoir, and a second end of the capillary media (100) projecting from a second end of the sheath extends within a bottom portion of the pot liner (24), and where an intermediate portion of the capillary assembly (100) is configured to extend over a top portion of the pot liner (24).

18 Claims, 21 Drawing Sheets

(56) References Cited

U.S. PATENT DOCUMENTS

| | | | | | |
|---|---|---|---|---|---|
| 5,852,896 | A | * | 12/1998 | Flasch, Jr. | A01G 27/02 47/79 |
| 5,921,025 | A | * | 7/1999 | Smith | A01G 27/06 47/79 |
| 6,094,862 | A | * | 8/2000 | Fuchigami | A01G 27/06 47/81 |
| 6,134,833 | A | * | 10/2000 | Bachman | A01G 27/02 47/79 |
| 6,219,969 | B1 | | 4/2001 | Dion | |
| 8,146,292 | B2 | | 4/2012 | Brandstaetter | |

FOREIGN PATENT DOCUMENTS

| | | | | |
|---|---|---|---|---|
| CN | 205812913 | U | | 12/2016 |
| DE | 2409714 | A1 | | 9/1975 |
| DE | 2426582 | A1 | | 12/1975 |
| DE | 2901773 | A1 | | 7/1980 |
| JP | H0471444 | U | | 6/1992 |
| JP | 3084717 | U | | 12/2001 |
| KR | 20170028734 | A | * | 3/2017 |
| KR | 20180079237 | A | | 7/2018 |

\* cited by examiner

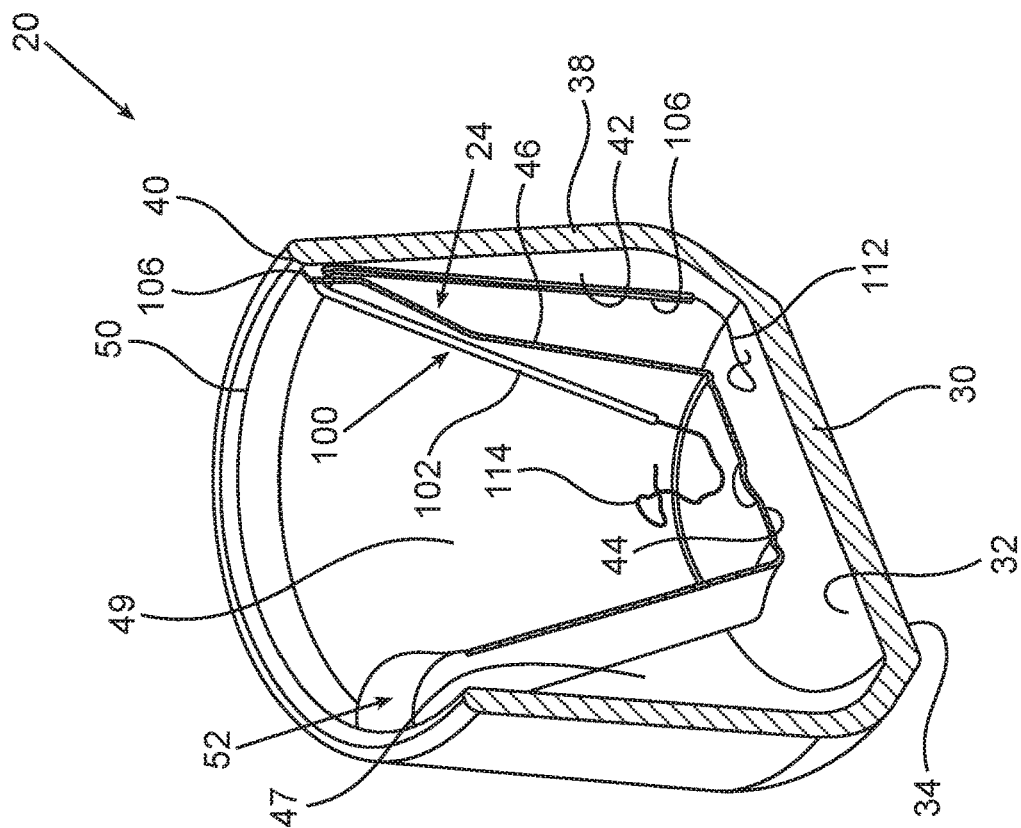
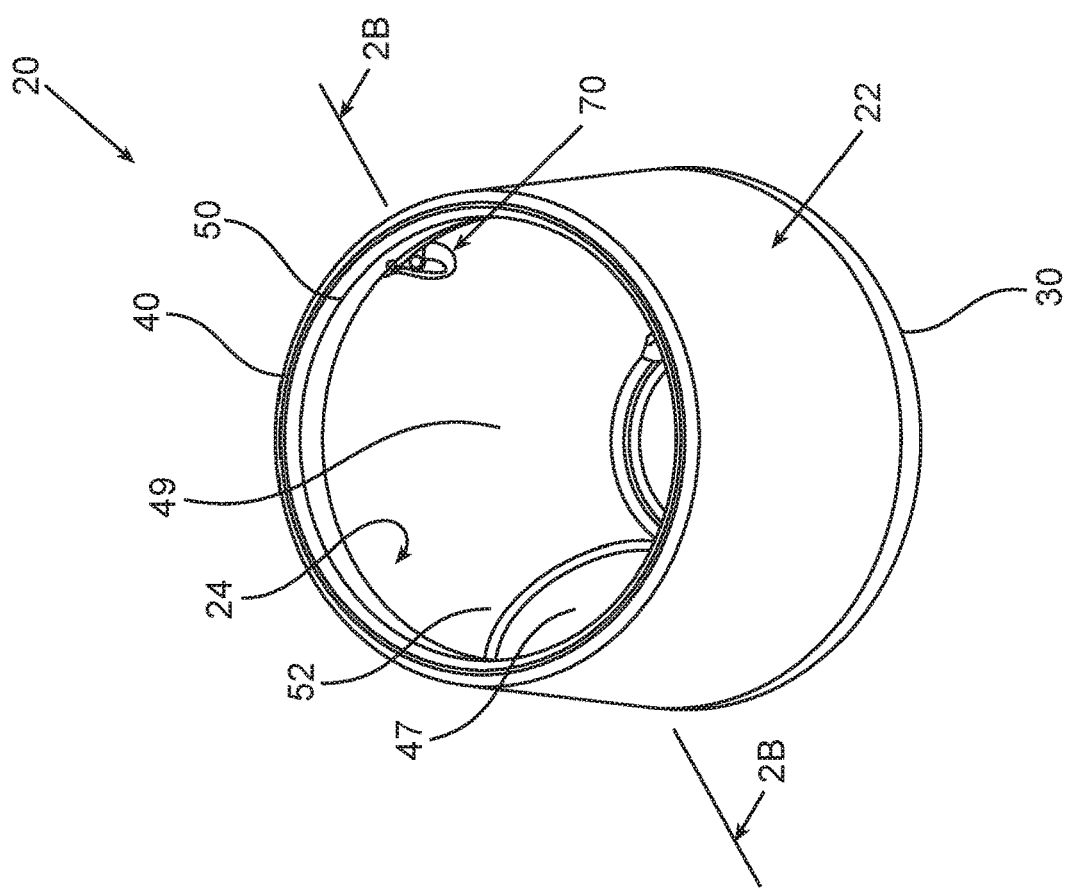
FIG. 2B
FIG. 2A

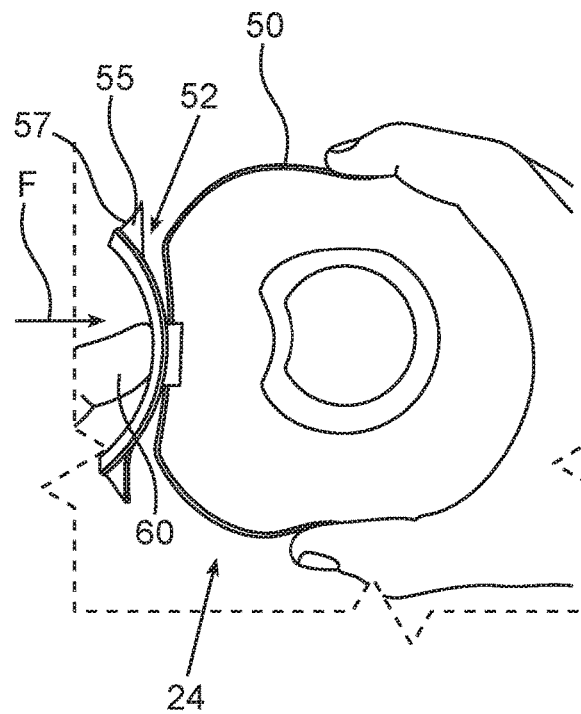
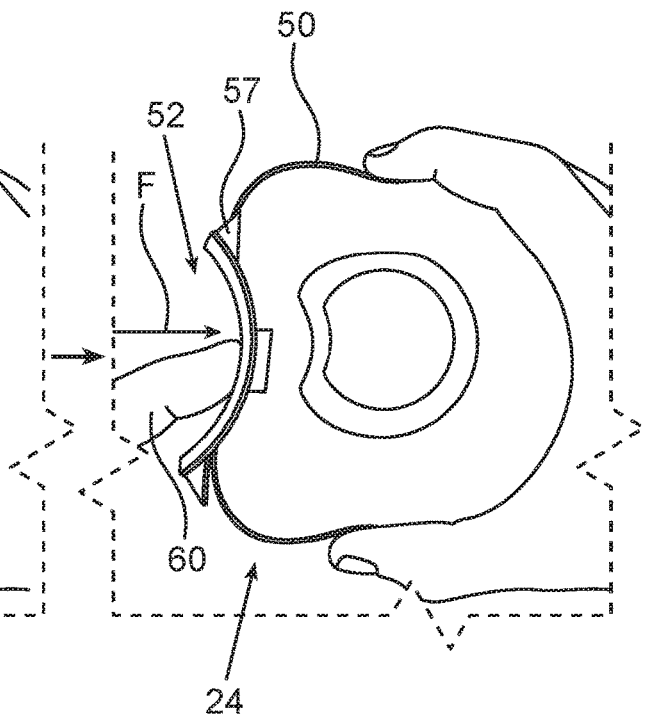
FIG. 6A    FIG. 6B
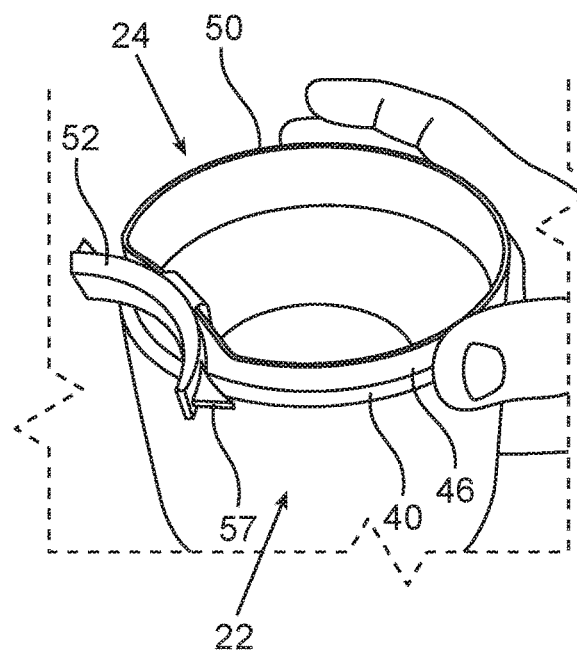
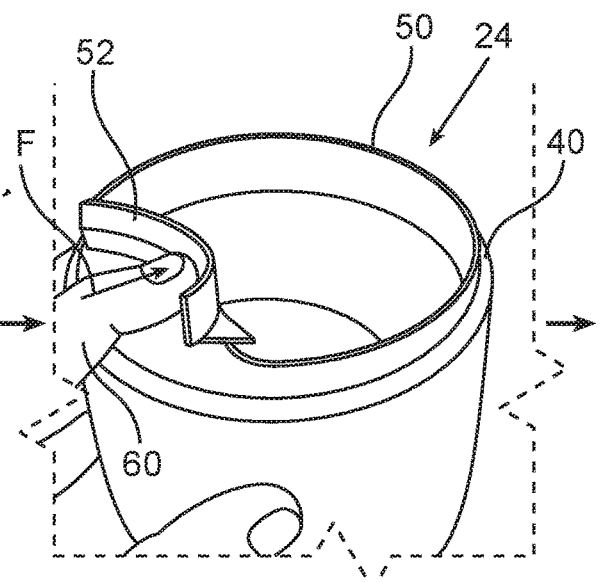
FIG. 7A    FIG. 7B

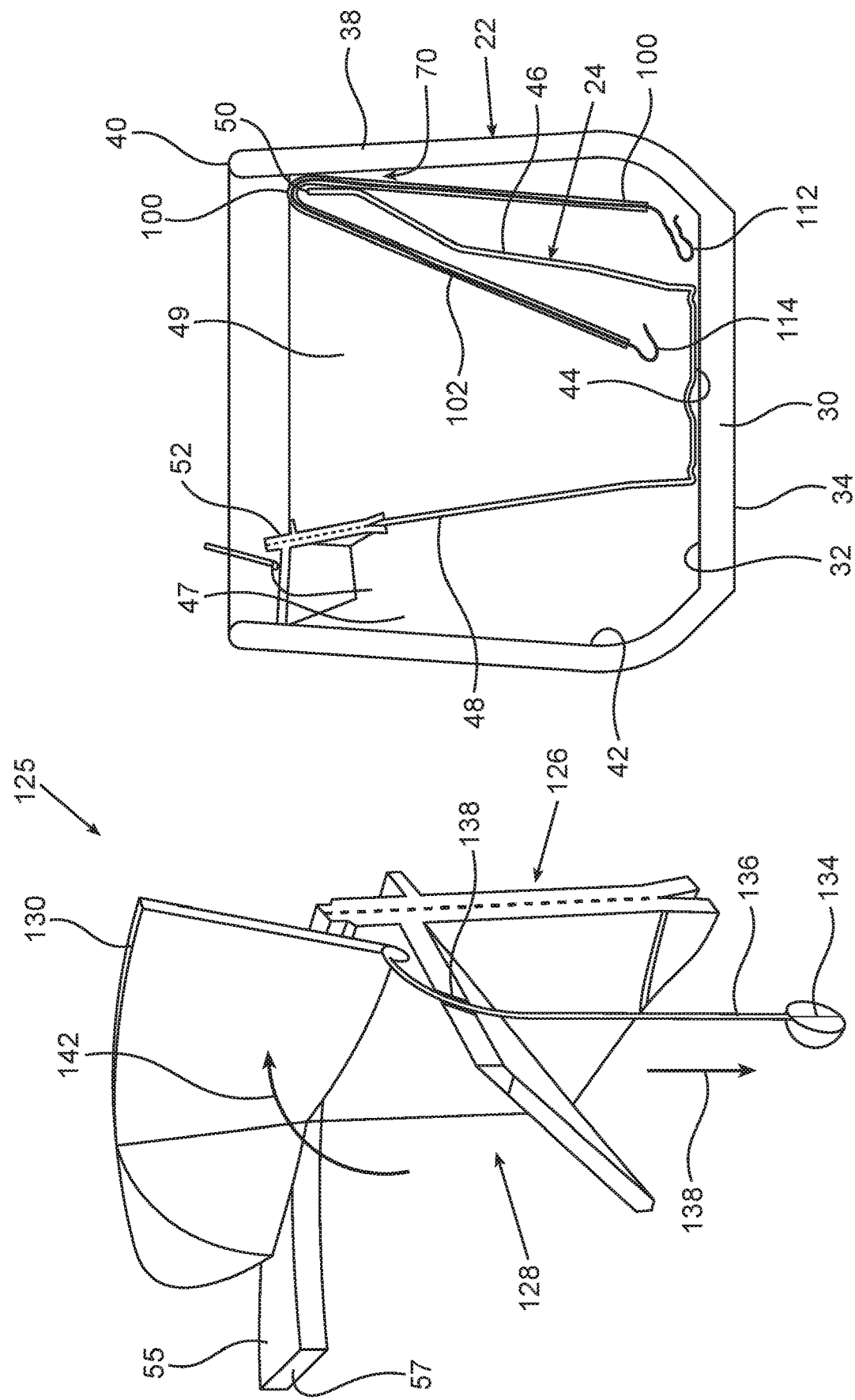

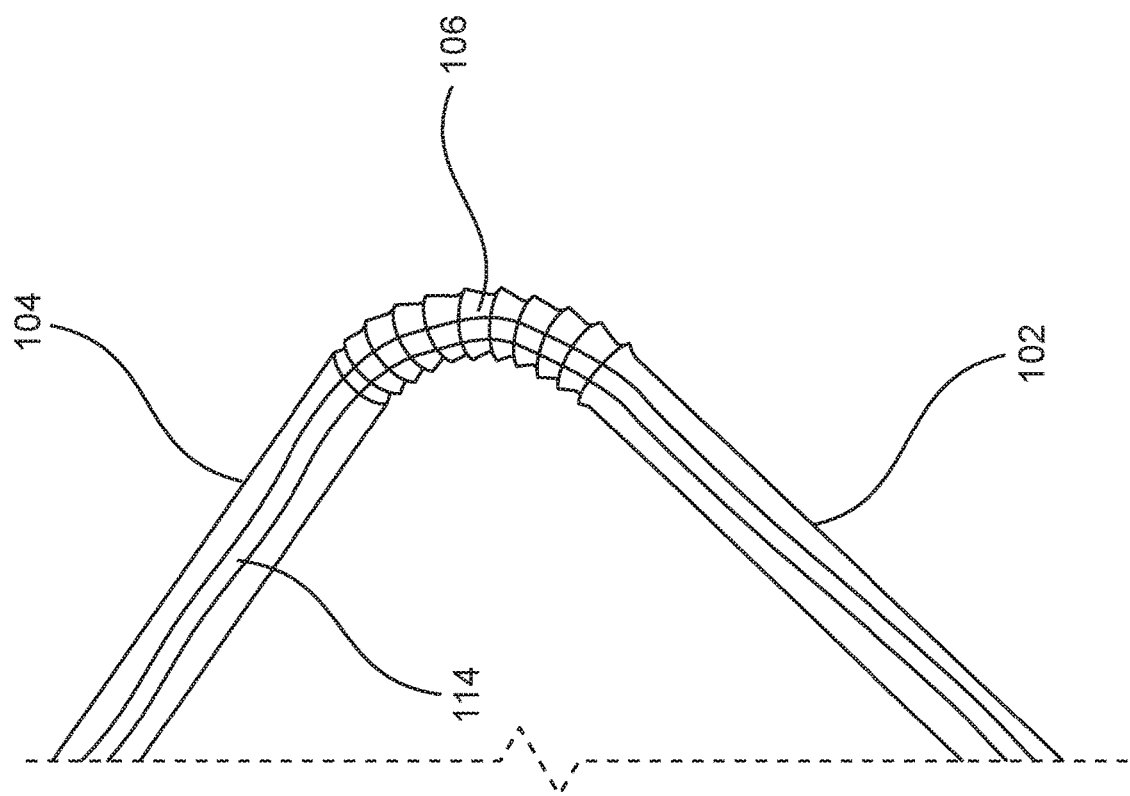
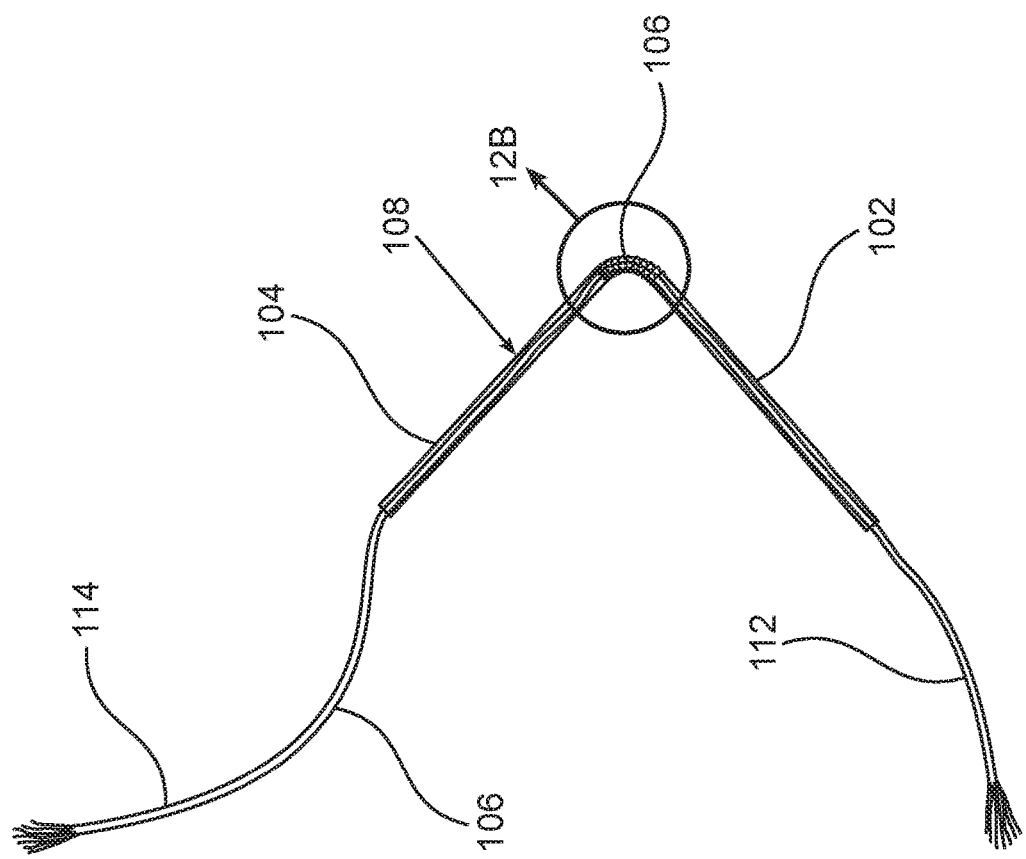
FIG. 12A
FIG. 12B

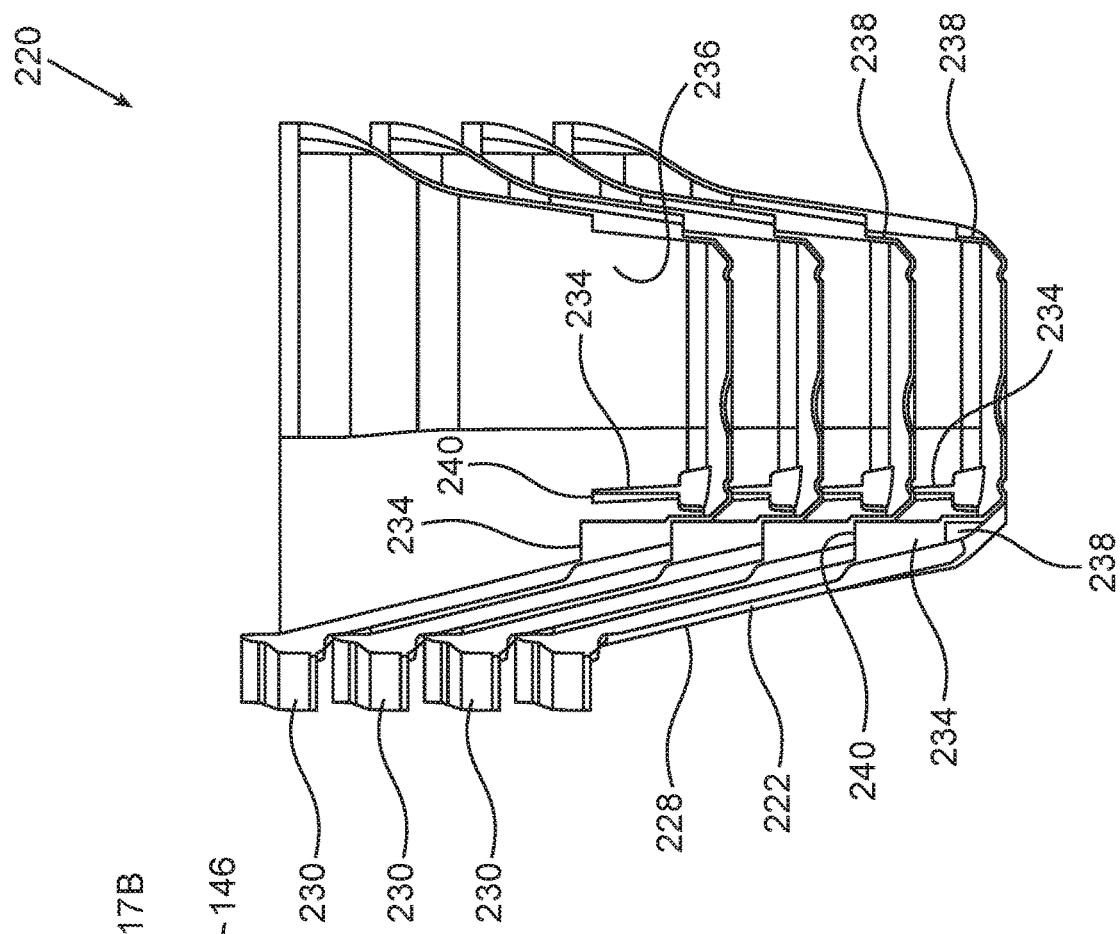
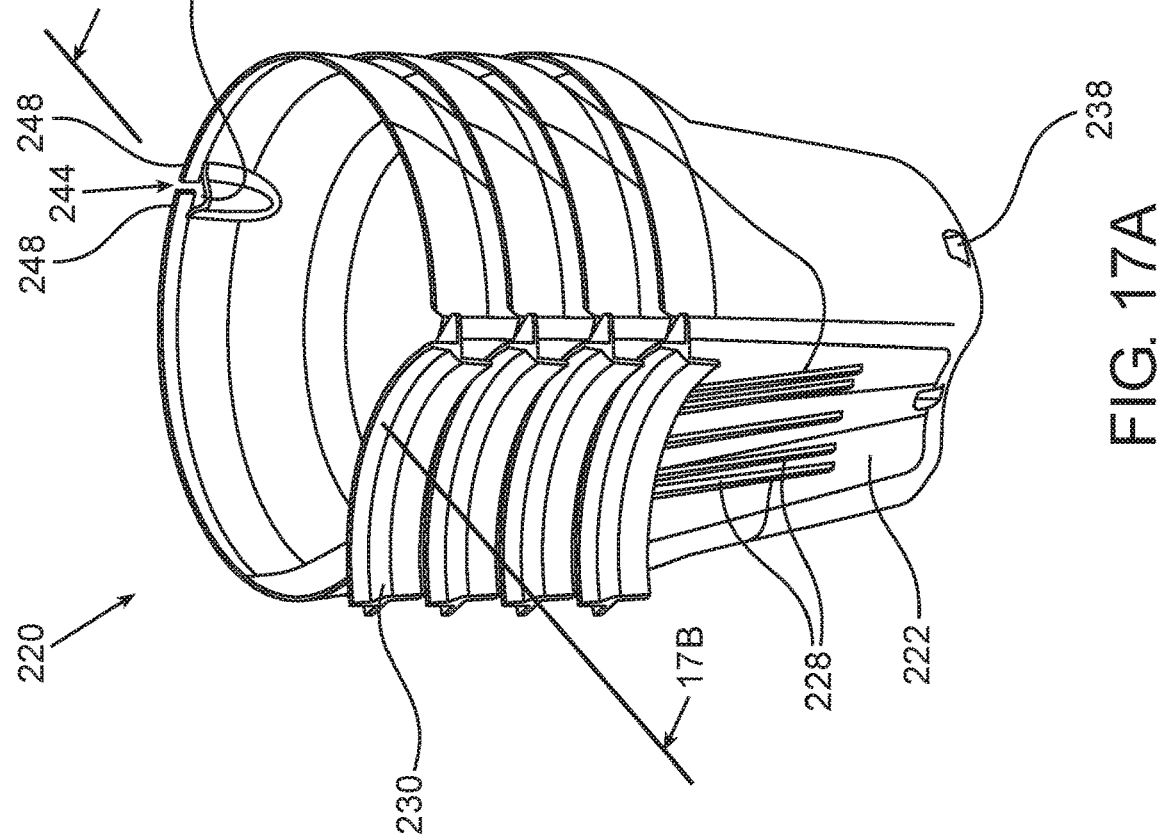
FIG. 17A
FIG. 17B

PLANT POT

TECHNOLOGICAL FIELD

The present disclosure is generally in the field of plant pots, and more particularly it is concerned with capillary irrigation pots.

The term pot as used herein after in the specification and claims is used in its broad sense and includes plant pots, planters etc., of any size, shape and material.

The term capillary irrigation suggests any form of sub-surface irrigation wherein a capillary media is used for delivering water, and optionally nutrients, from a liquid reservoir to a plant, by capillary action, as well as other passive or active action.

BACKGROUND ART

The following references may be considered to be of relevance as background to the presently disclosed subject matter:
U.S. Pat. No. 8,146,292;
U.S. Pat. No. 3,192,665;
KR20180079237;
CN201252752Y;
CH610716A5;
DE2409714; and
CN205812913U.

BACKGROUND

U.S. Pat. No. 8,146,292 relates to an insert container for plant pots with a base, at least one side wall, which adjoins the base with a lower edge, is formed with an upper edge open at the top and surrounds an interior, a longitudinal axis extending perpendicular to the base, supports arranged on the base and extending in the direction of the longitudinal axis, at least one water-permeable watering device arranged on the base and at least one indentation which extends in the direction of the longitudinal axis, in the at least one side wall.

U.S. Pat. No. 3,192,665 relates to a device for providing a controlled moisture tension within a growing medium, the device being self-regulatory in preferred operation, and providing a feature whereby aeration of the soil may occur as a portion of the regulatory process.

KR20180079237 relates to a plant cultivation pot which can grow plants using soil or processed soil without using soil. The present invention realizes a new type of plant pot for plant cultivation that combines an outer pot with a structure capable of effectively introducing an external air flow and an inner pot with an efficient water storage structure. It is possible to create optimal plant growth environment by enabling oxygen supply, and it is possible to easily handle such as washing and water exchange through the structure in which outer pots and inner pots can be separated, and the plant pots.

CN201252752Y discloses an assembly type water-saving flower pot, which is invented for solving the problem of sole function of the prior art. The assembly type water-saving flower pot comprises a flower pot body, the flower pot body is provided with a soil moisture inspection hole, a water tank casing matched with the flower pot body is arranged outside the flower pot body, the bottom of the water tank casing is in thread-connection with the water in the flower pot body in a sealed way, and an accommodating space is formed between the inner surface of the water tank casing and the outer surface of the water pot body; and a plurality of water seepage holes are arranged on the side wall of the flower pot body from bottom to top. By adopting the structure, since the water tank casing is transparent, the flower pot is artistic and novel; and since the water in the water tank soaks into the water pot through the water seepage holes on the inner wall of the flower pot body, the flower grower does not need to worry about excessive watering or insufficient watering to affect the normal growth of the flowers and also does not need to always try to water the flowers all the time, and the use is convenient.

CH610716A5 discloses a pot comprising a compartment for the plant and a compartment for the liquid for moistening said plant. The two compartments are separated by a porous wall, through which the liquid can filter. This wall has holes passed through by wicks intended to moisten the plant by capillary action.

DE2409714 discloses a roughly cylindrical outer plant pot, of larger diameter at the top than at the bottom. The inner plant pot is roughly conical, thereby leaving a fairly large gap between the outer and inner pot, which holds the liquid. The inner pot has a rim round the top which rests on the top under collar of the outer pot. The top edge of the inner plant pot has at least one duct-shaped indentation, leaving a vertical cavity containing a wick-type absorption device. This wick is positioned between the outer and inner pots and extends over into the inner pot. Two other, diametrically opposite indentations are for the fingers to grip the inner pot. The top, outer edge of the indentations has radial projections.

CN205812913U discloses an automatic water-supply flowerpot, including inner basin, it is sleeved on the outer basin outside described inner basin, it is formed with cavity between described outer basin and inner basin, also include the absorbent member be located on described inner basin, be placed in described cavity, and between described inner basin and outer basin, with the carriage assembly that described inner basin is supported. Automatic water-supply flowerpot described in the utility model, it is ensured that one time water storage just can be for a long time to soil automatic water-supply, and it is simple and reliable for structure, has good practicality.

It is appreciated that acknowledgement of the above references is not to be inferred as meaning that these are in any way relevant to the patentability of the presently disclosed subject matter.

GENERAL DESCRIPTION

The present disclosure is concerned with a capillary irrigation pot system configured for optimal, long lasting irrigation of a plant accommodated therein.

A first aspect of the disclosure is directed to a capillary irrigation pot system comprising:
  a liquid impermeable pot housing;
  a liquid impermeable pot liner configurable for receiving within said pot housing, wherein once received within the pot housing gives rise to an irrigation liquid reservoir extending between an inside wall surface of the pot housing and an outside wall surface of the pot liner;
  and a capillary assembly comprising a capillary media received within a substantially liquid impermeable sheathe, wherein a first end of the capillary media projecting from a first end of the sheath extends at a bottom portion of the irrigation liquid reservoir, and a second end of the capillary media projecting from a second end of the sheath extends within a bottom portion of the pot liner, and wherein an intermediate portion of the capillary assembly is folded over a top portion of the pot liner.

The term irrigation liquid as used hereinafter in the specification and claims denotes any irrigation liquid, with or without nutrients and other agro-chemical agents.

According to another aspect of the disclosure there is provided a liquid impermeable pot liner made of a rigid though pliable material, said pot liner comprising a plant space defined by a perimetric side wall upwardly extending between a base and a top rim, with an inwardly indented portion at the side wall; wherein when the pot liner is placed within a liquid impermeable pot housing the top rim bears snug against a top inside wall surface of the pot housing.

Yet an aspect of the disclosure is concerned with a planting pot set comprising:

- a liquid impermeable pot housing of a nominal size and configured with a base and side walls upwardly extending therefrom;
- a pot liner of corresponding nominal size, made of liquid impermeable, rigid though pliable material, said pot liner comprising a plant space defined by a perimetric side wall upwardly extending between a base and a top rim, with an inwardly indented portion at the side wall, and at least one capillary assembly holder at a top portion of the pot liner, wherein when the pot liner is placed within the pot housing said top rim bears snug against a top inside wall surface of the pot housing, with an irrigation liquid reservoir extending between an inside wall surface of the pot housing and an outside wall surface of the pot liner; and
- at least one capillary assembly comprising a capillary media received within a substantially liquid impermeable sheathe, wherein a first end of the capillary media projecting from a first end of the sheath is placeable at a bottom portion of the irrigation liquid reservoir, and a second end of the capillary media projecting from a second end of the sheath is placeable within a bottom portion of the pot liner, and wherein an intermediate portion of the capillary assembly is folded over a top portion of the pot liner and retainable by the capillary assembly holder.

The arrangement is such that at an operative, assembled position, a first end of the capillary media is disposed within the irrigation liquid at the irrigation liquid reservoir, and the second end of the capillary media is disposed at the vicinity of a root base of a plant within the pot liner.

The pot liner is elastic and thus once deformation force is applied to a top portion thereof, it is compressed and deformed, and can easily inserted into a pot housing, and upon ceasing the deformation force, the pot liner will spontaneously regain its shape and bias against at least a top portion of the inside wall of the pot housing. This arrangement facilitates for bearing of at least a top rim of the pot liner against an inside wall surface of the pot housing, and further wherein a pot liner can be received within pot housing of size variations.

Any one or more of the following features, designs and configurations can be applied to the plant pot according to any aspect of the present disclosure, separately or in various combinations thereof:

- The pot housing and/or the liner can be of any desired geometrical shape;
- The pot housing can be made of a liquid impermeable material or it can comprise a liquid impermeable liner or it can be coated with a liquid impermeable material;
- The pot liner can be made of a capillary material, at least in part;
- The pot liner can be made of a rigid though pliable material, said pot liner comprising a plant space defined by a perimetric side wall upwardly extending between a base and a top rim, with an inwardly indented portion at the side wall; wherein when the pot liner is placed within a liquid impermeable pot housing the top rim bears snug against a top inside wall surface of the pot housing.
- The pot liner can comprise a retention member disposed at the top rim above the indented portion, said retention member is configured for retaining the indentation of the indented portion and applying pressure against the inside wall surface of the pot housing;
- The retention member can have a curved shape, complimentary of the indented portion, though at an inverted orientation of the pot liner top edge;
- The arrangement is such that the pot liner can be accommodated within a pot housing, wherein at least a top rim of the pot liner snugly bears against an inside wall surface of the pot housing, apart for the indented portion, wherein an opening at the top of the indented portion, serves as an irrigation liquid refilling opening;
- The pot housing and the pot liner can be tubular-shaped;
- An outside surface of the pot housing can be ornamented by patterning and/or coloring;
- The retention member can be integral with the pot liner or attachable thereto;
- The pot liner can be stackable nestable within like pot liners;
- The pot liner can be configured with a nesting stopper for restricting nesting extent of pot liners within one another, to thereby prevent deformation of the retention member;
- The nesting stopper can be one or more inwardly projecting ribs at a nesting pot liner, configured for engaging with an outside bottom portion of a nested pot liner;
- A top edge of the pot liner, at the indented portion, can be inwardly curved or substantially straight;
- The inwardly indented portion can define, together with a corresponding inside wall surface of a pot housing, the irrigation liquid reservoir;
- A top of the inwardly indented portion can be closed by a reservoir lid;
- The lid can be pivotally articulated to the retention member;
- The lid can be configured with a manipulating element; the manipulating element can be an opening or a lifting element upwardly projecting from a top surface of the lid;
- The inwardly indented portion can accommodate an irrigation liquid level indicator;
- The liquid level indicator can comprise a buoy suspended from the lid, whereby the lid is displaceable between its normally closed position when liquid within the reservoir is above a predetermined liquid level, and an open position at the event that liquid within the reservoir drops below said predetermined liquid level;
- The top portion of the pot liner can be configured with at least one capillary assembly holder for securing the capillary assembly;
- The capillary media can be made of any sort of material, either organic or inorganic, uniform or not, comprising one or more strands, interwoven or not, and combinations thereof;

The capillary assembly holder can be disposed at the top rim of the port liner, or below said top rim;

The capillary assembly holder can be configured such that capillary assembly does not project over a top edge of the pot liner;

The capillary assembly holder can be configured as an opening below the top edge of the pot liner; the opening extending at a side wall of the pot liner;

The opening of the capillary assembly holder can have an axial orientation extending perpendicular to a longitudinal axis of the pot liner;

The capillary assembly holder can be configured as a recessed portion below the top edge of the pot liner;

The capillary assembly holder can be configured for snappingly receiving a capillary wick assembly;

When inserted into the pot housing, the base of the pot liner can bear over an inside surface of the base of the pot hosing, by generating radially outwards force;

The sheath can comprise a folding portion, whereby a lumen of the sheath remains open at the event of folding same;

The foldable portion can be a bellows-type foldable section;

The foldable portion enables folding the capillary assembly about 180°;

At an assembled position the pot liner can be fully received within the pot housing;

A portion of the capillary media exposed to the liquid or to the planting mixture, can be altered in order to control the rate of water deliver and the mixture of the soil. Exposing more of the media on the reservoir side, accelerates free evaporation of water from the reservoir thus slowing down water delivery rate. Exposing more of the media on the planting mixture size, increases the soil moisture as water are delivered to higher level within the planting mixture body;

At an assembled position the pot liner is fully positioned within the pot housing, with a top edge of the pot liner disposed below a top edge of the of housing;

The pot system is substantially sealed, and liquid evaporation occurs substantially only through the plant and the soil;

The pot liner can be configured with reinforcing ribs for reinforcing at least the depressed portion;

The reinforcing ribs can be configured for reinforcing articulation of the retention member at the top portion of the pot liner;

At an assembled position a top rim of the pot liner is configured for biased bearing against an inward wall surface of the pot housing, below a top edge of the said pot housing;

The top pot liner rim can have a diameter greater than a diameter of top portion of the pot housing;

The pot liner can be configured to fit different diameters pf pot housings;

The pot housing can be configured at a top portion thereof with an inward projecting pot liner arresting arrangement, for prevent spontaneous pop-up of the pot liner;

The pot liner arresting arrangement can be an inward projection having a diameter suited for arresting a top rim of the pot liner;

The inward projection can be an annular rim or a series of projections;

The pot housing can have a dome-shape, with a top opening thereof having a narrower diameter with respect a lower body portion thereof;

The pot liner can be adhered within the pot housing;

The pot liner is rigid though pliable, wherein resiliency can be applied thereto by flexibility of material and/or thinned wall portions.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 2A is a top perspective view of a pot system according to an example of the disclosure;

FIG. 2B is vertical section along line 2B-2B in FIG. 2A;

FIGS. 6A and 6B exemplify flexibility of the pot liner;

FIGS. 7A to 7D are sequential steps of inserting a pot liner into a pot housing, according to the disclosure;

FIG. 9C is a section along line 9C-9C in FIG. 9A;

FIG. 9D is a vertical section through a pot assembly of the disclosure, fitted with an automatic liquid level indicator;

FIG. 12A illustrates an assembled capillary assembly according to the present disclosure;

FIG. 12B is an enlarged view of the portion marled 12B in FIG. 12A, directed to a folding portion of the capillary assembly;

FIG. 17A is a perspective view illustrating a stack of nested pot liners according to another example of the disclosure;

FIG. 17B is a section taken along line 17B-17B in FIG. 17A;

DETAILED DESCRIPTION OF EMBODIMENTS

Figure 1:
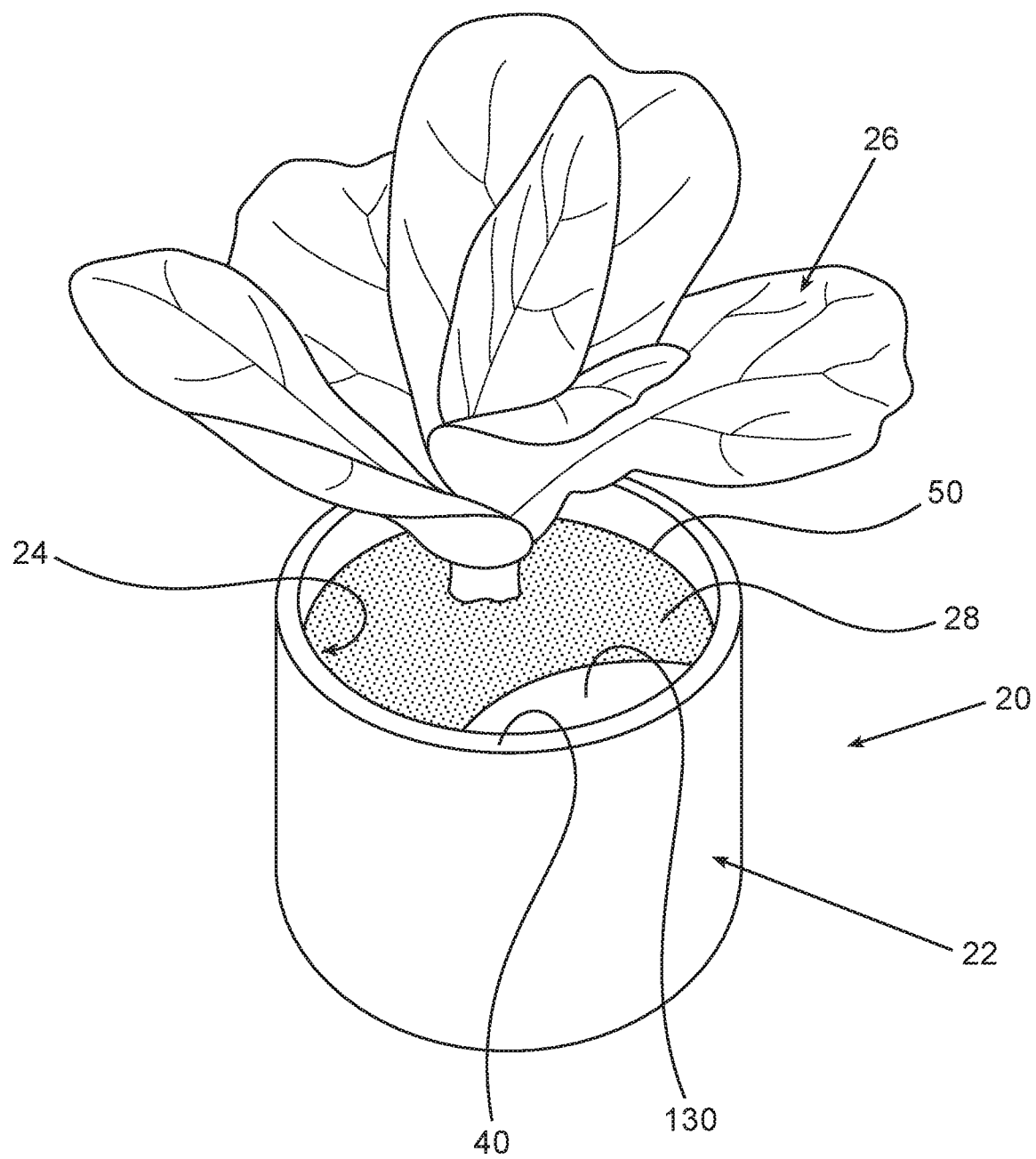
FIG. 1 illustrates a pot according to the disclosure, with a plant planted therein.

Attention is first directed to FIG. 1 of the drawings, illustrating a pot system according to an example of the present disclosure, generally designated 20, comprising a pot housing generally designated 22 accommodating a pot liner 24 received within the pot housing 22, and a plant 26 planted in the growing media 28 (soil) within the pot liner 24.

The pot housing 22 (best seen in FIG. 2A and in sectioned view of FIG. 2B) is a tubular, round vessel, being liquid impermeable (made of liquid impermeable material e.g., porcelain, glass, plastic, metal, etc.), and/or coated with a liquid impermeable layer for improving impermeability thereof. Alternatively, the pot housing can be made of wood, composite materials etc., adjusted as needed to prevent liquid permeability. The pot housing 22 has a base with an inside bottom surface 32, and a bottom surface 34 for placing on a surface, and side wall 38 extending from the base 30 and ending at a pot housing top edge 40. Side wall 38 has an inside surface 42 and in the present example the side wall 38 slightly tapers upwardly. The shape and size of the inside section of the pot housing 22 can vary, however having a nominal size, to which the size of pot liner 24 corresponds, at least as far as the top edge size of the pot housing.

Figure 3:
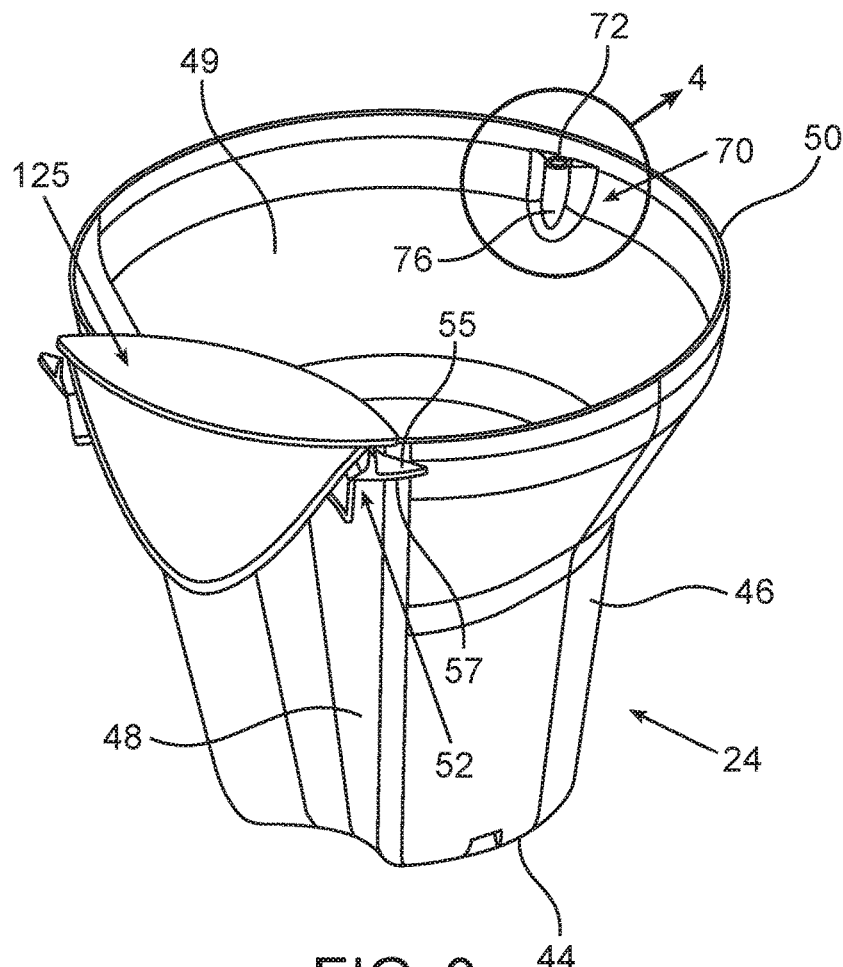
FIG. 3 is a top perspective view of a pot liner according to ab aspect of the disclosure.

Turning now to FIG. 3, reference is made to the pot liner 24, which as mentioned hereinabove, is designated a nominal size corresponding to the pot housing 22, such that at an assembled position (FIGS. 1 and 2) the pot liner 24 is fully received within the pot housing 22.

The pot liner 24 is made of a liquid impermeable material, and has no openings, except near a top edge thereof, as will be discussed hereinafter. The pot liner 24 is made of a rigid though pliable material, so that it can be deformed upon applying external force thereto, however, will assume its original shape upon ceasing said external force.

The pot liner 24 has a general frustoconical shape, with a base 44 and a perimetric side wall 46 however with a longitudinal inward shaped depression 48 extending along the side wall 46. Once placed within the pot housing 22, the depressed/indented portion 48 serves as a filling duct for filling irrigation liquid into an irrigation liquid reservoir and for accommodating a liquid level indicator, to be discussed. A plant/planting space 49 is defined by the perimetric side wall 46 upwardly extending between the base 44 and a top edge/rim 50 of the pot liner 24.

Figure 5A:
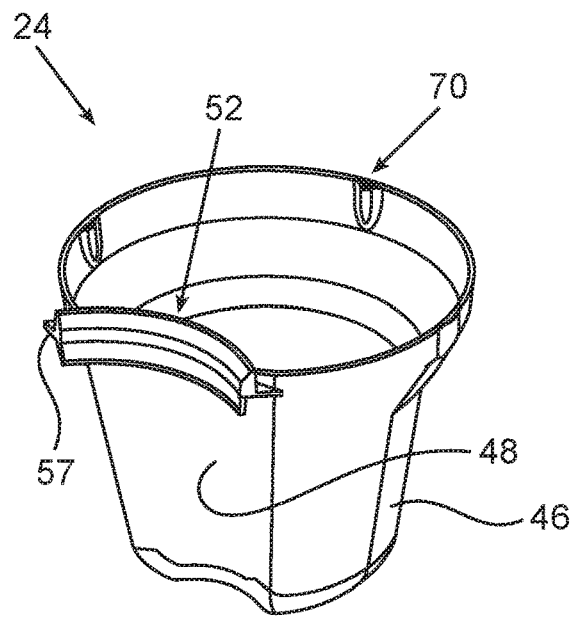
FIGS. 5A to 5C are perspective front, and re4ar views and a top view, respectively, of a pot liner according to an example of the disclosure.
Figure 5B:
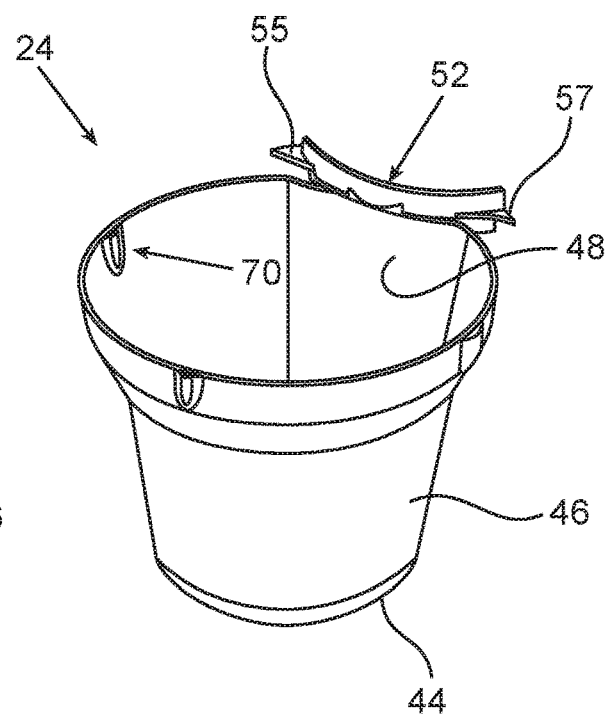
Figure 5C:
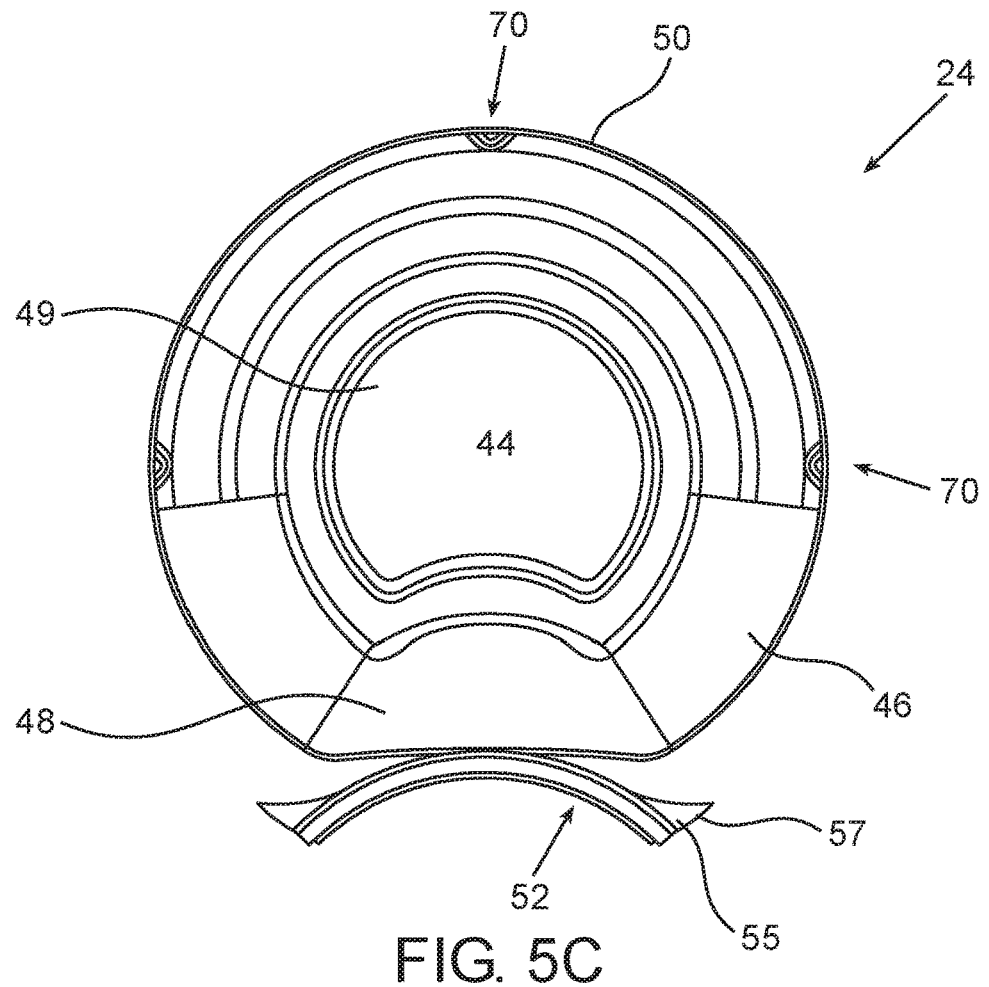

The top edge 50 of the pot liner, at the vicinity of the indented portion 48, is configured with a retention member 52, said retention member can be integral with the pot liner 24 (as in the example of FIGS. 5A-5C), or it can be applied thereto (as per retention member 52' in FIGS. 11A to 11D). The retention member 52 is made of stiff material whereby applying a force thereto results in deformation of the pot liner 24. In particular, as illustrated in FIGS. 6A and 6B, applying radially inward directed force, in direction of arrow F (by user's finger 60) the pot liner deforms, at least at a top portion thereof. The retention member 52 is a crescent-shaped element, complimentary to the top edge 50 of the pot liner 24, though disposed at an opposite orientation, and configured with two end platelets 55 each having an end edge 57.

Figures 7C, 7D:
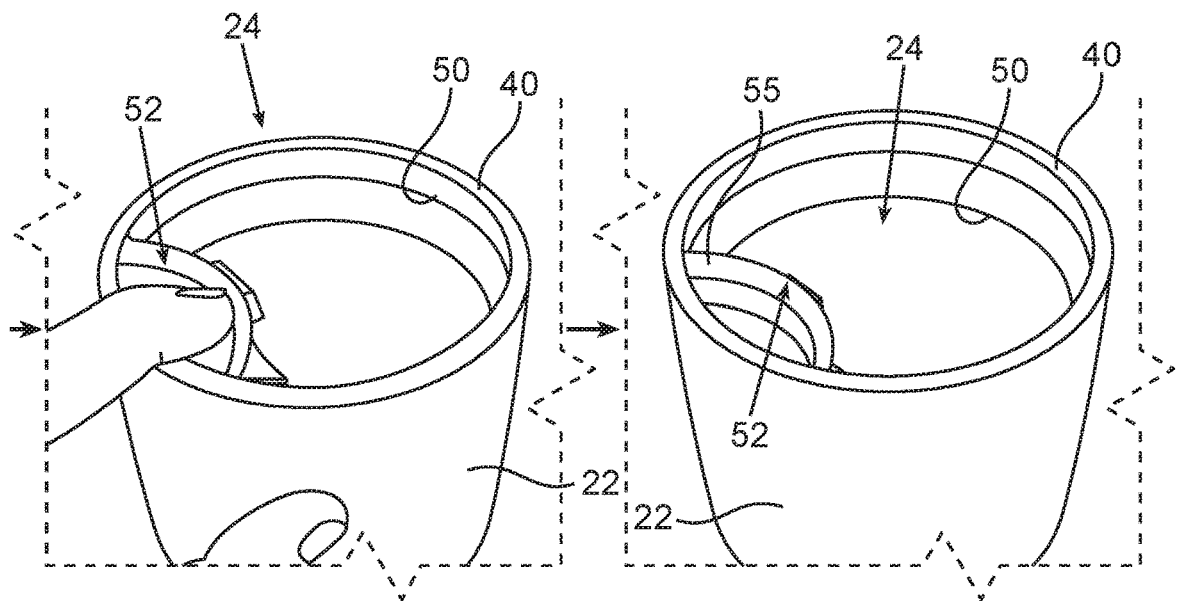

The arrangement being such that flexibility of the pot liner 24 facilitates easy insertion into a pot housing, and once in place the top edge 50 of the pot liner snugly bears against an inside top surface portion of the pot housing (FIG. 7D). This is exemplified in sequential images of FIGS. 7A to 7D. In FIG. 7A the pot liner 24 is freely placed within the pot housing 22 (wherein the top portion of the pot liner rests over the top edge 40 of the pot housing 22). Then, radial inward force F is applied by user's finger 60, in direction of arrow F (FIGS. 7B and 7C) resulting in deformation of the pot liner, namely restricting the circumscribing circle at least at the top portion thereof, such that it is fully positioned within the pot housing (FIG. 7D), namely with a top edge 50 of the pot liner disposed below a top edge 40 of the of housing 22.

Figure 16:
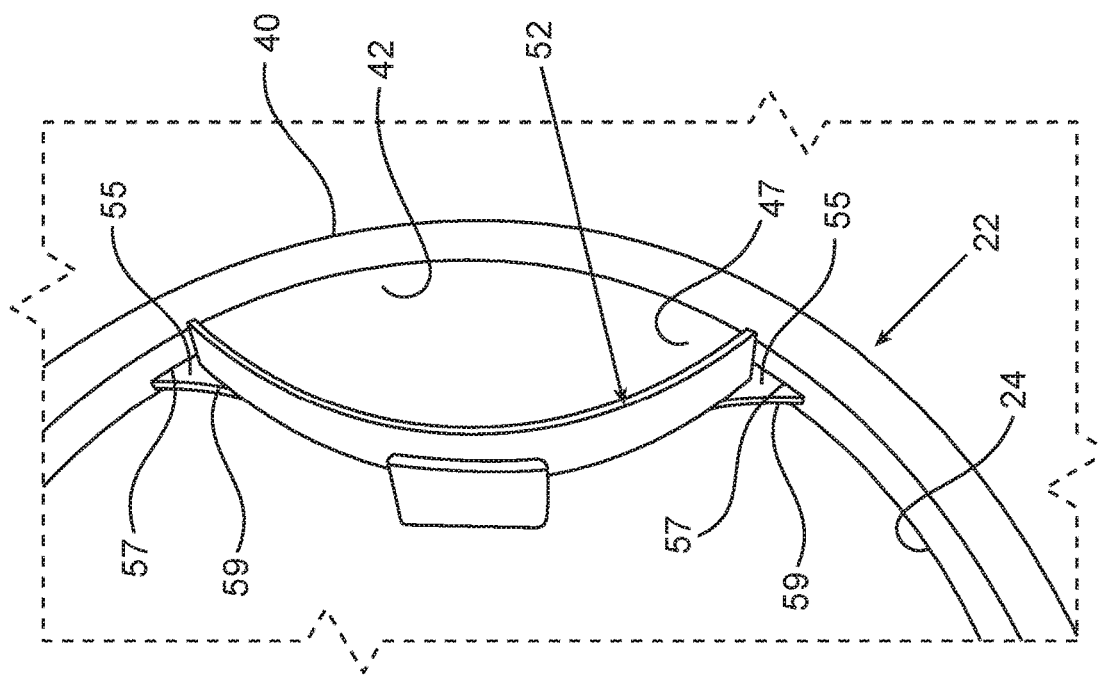
FIG. 16 is an enlargement of the portion marked 16 in FIG. 15.
Figure 15:
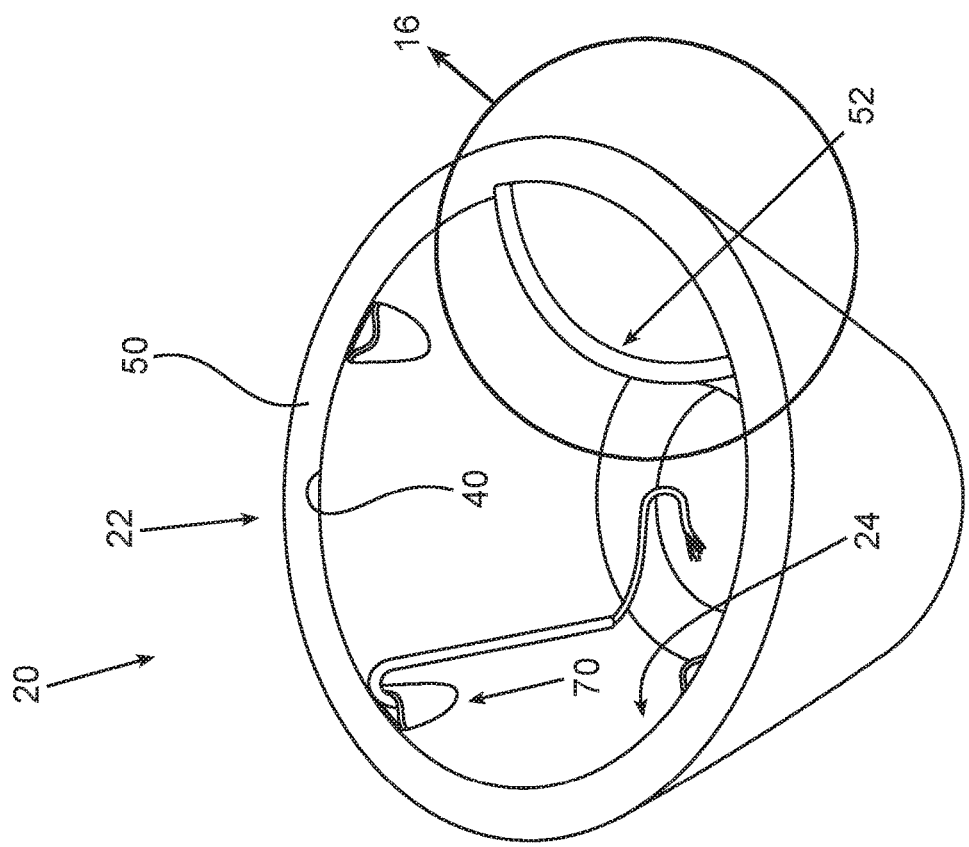
FIG. 15 illustrates a pot system according to the disclosure, ready for planting.

As seen, best in FIGS. 15 and 16, at the assembled position the end edges 57 of end platelets 55 bare against the inside wall surface 42 of the pot housing 22, providing support and sealing the deformed end portions 59 of the top edge 50 against the inside wall surface 42 of the pot housing 22.

Figure 4A:
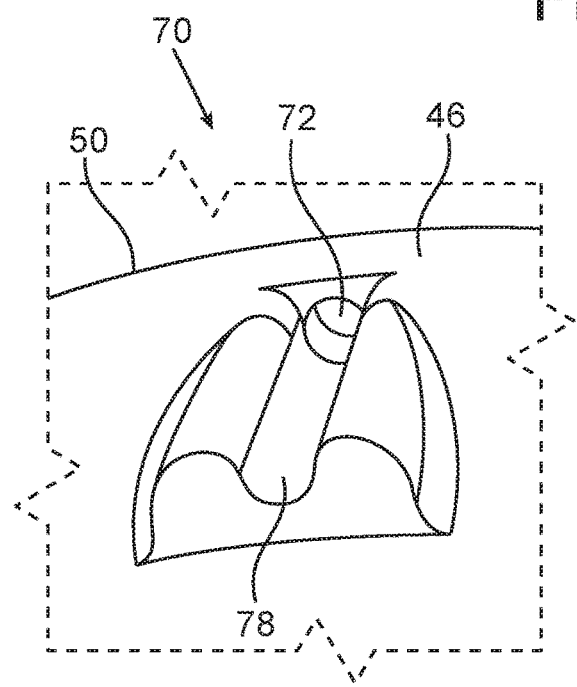
FIGS. 4A and 4B are directed to a capillary assembly holder according to an example of the disclosure seen in portion 4 at FIG. 3, being a perspective outside bottom view and a perspective inside top view, respectively.
Figure 4B:
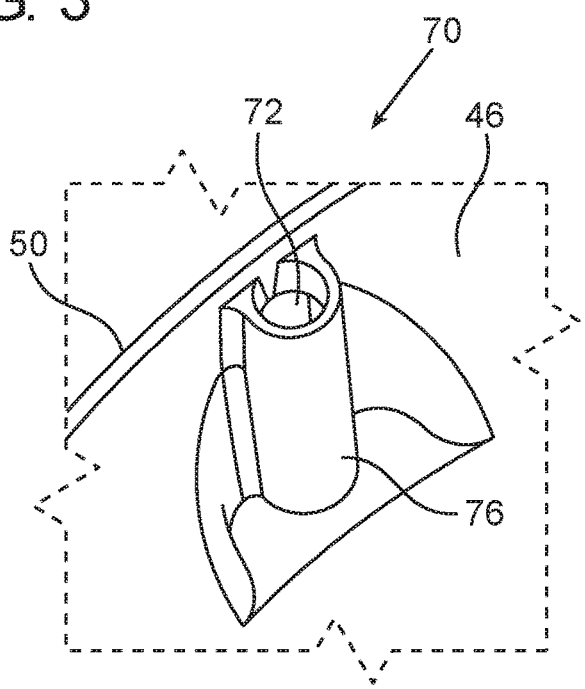

As mentioned hereinbefore, the entire body of the pot liner 24 is liquid impermeable, and however comprises one or more capillary assembly holders, disposed below the top edge 50, and configured for passing therethrough a tubular capillary assembly (to be discussed hereinafter in detail). A capillary assembly holder according to an example of the disclosure is designated 70 (shown in detail in FIGS. 4A and 4B), and comprises an opening 72 below the top edge 50, the opening extending at a side wall of the pot liner with an axial orientation extending perpendicular to a longitudinal axis of the pot liner 24. The capillary assembly holder 70 further comprises a tubular section segment 74 radially disposed and inwardly extending from the side wall 46. The opening 72 is formed so as to give rise to a path extending such that a capillary assembly generally designated 100 (discussed in greater detail hereinafter) is forced to bend at an acute angle from the outside of the pot liner into the space 49. Thereby, a tubular capillary assembly member can be held by the external channel 78 formed by the tubular section. The arrangement is such, as will be exemplified hereinbelow, that a tubular capillary assembly can extend from an outside of the pot liner 24, through opening 72 and into the plant space 49 of the pot liner 24. It can be seen that the pot liner 24 of the example shown in FIG. 3 comprises a single capillary assembly holder 70, whereas the pot liner 24 of the example shown in FIGS. 5A to 5C comprises three capillary assembly holders 70, by way of example.

An irrigation liquid reservoir extends between inside wall surfaces of the pot housing (namely inside bottom surface 32 and inside wall surface 42) and outside surfaces of the pot liner 24 (namely base surface 44 and side wall 46). It is appreciated that an assembled position of the pot system, the base surface 44 of the pot liner can reach the inside bottom surface 32 or extend spaced therefrom, however with a sufficient liquid reservoir extending between the depressed portion 48 of the pot liner 24 and the inside wall surface 42 of the pot housing 22, defining a well-like irrigation reservoir 47 (FIGS. 2A, 2B, 9D, 9E, 16). As will be explained hereinafter, said well-like irrigation reservoir can accommodate a liquid level indicator.

Another example a of capillary assembly holder 80 is illustrated in FIGS. 13A to 13D, said capillary assembly holder 80 comprises an opening extending through the side wall 46 of the pot liner 24, with a path extending such that the capillary assembly generally designated 100 (discussed in greater detail hereinafter) is forced to bend at an acute angle from the outside of the pot liner into the space 49. Further noted, an outside portion of the capillary assembly holder 80 is configured with two wing-like members 84 (best seen in FIG. 13B), configured for arresting an outside portion 102 of the capillary assembly 100.

Figure 14A:
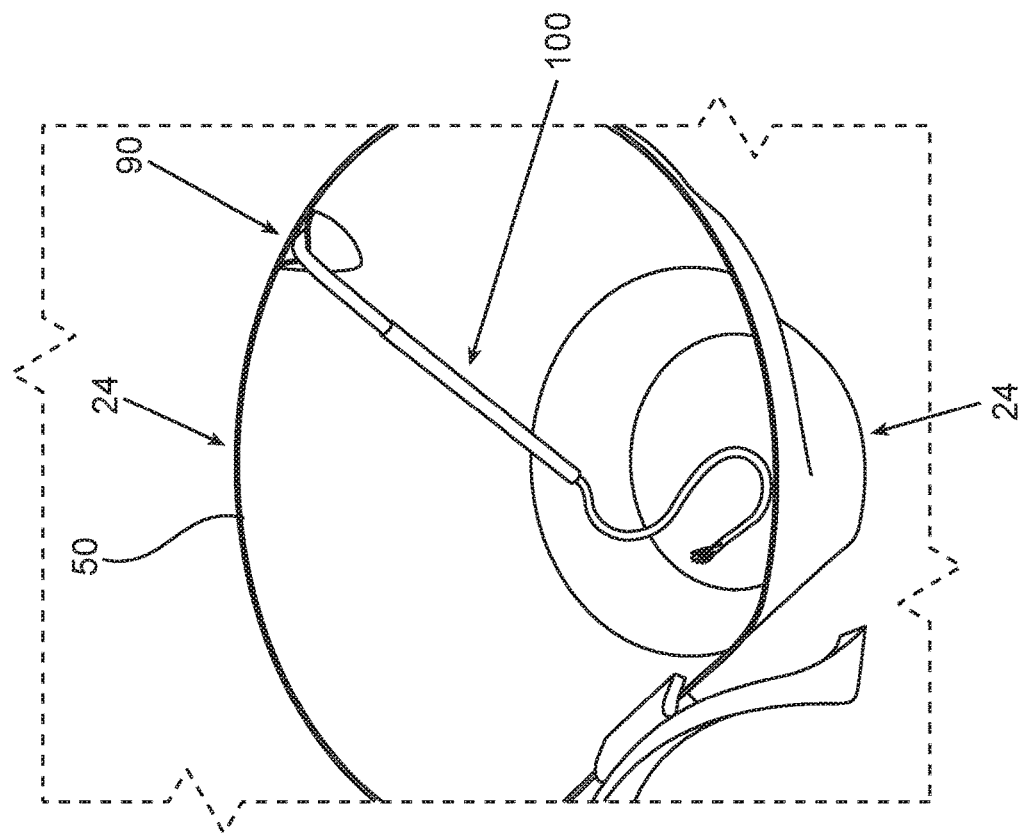
FIGS. 14A to 14C are directed to yet an example of a pot liner, configured with a capillary assembly.
Figure 13D:
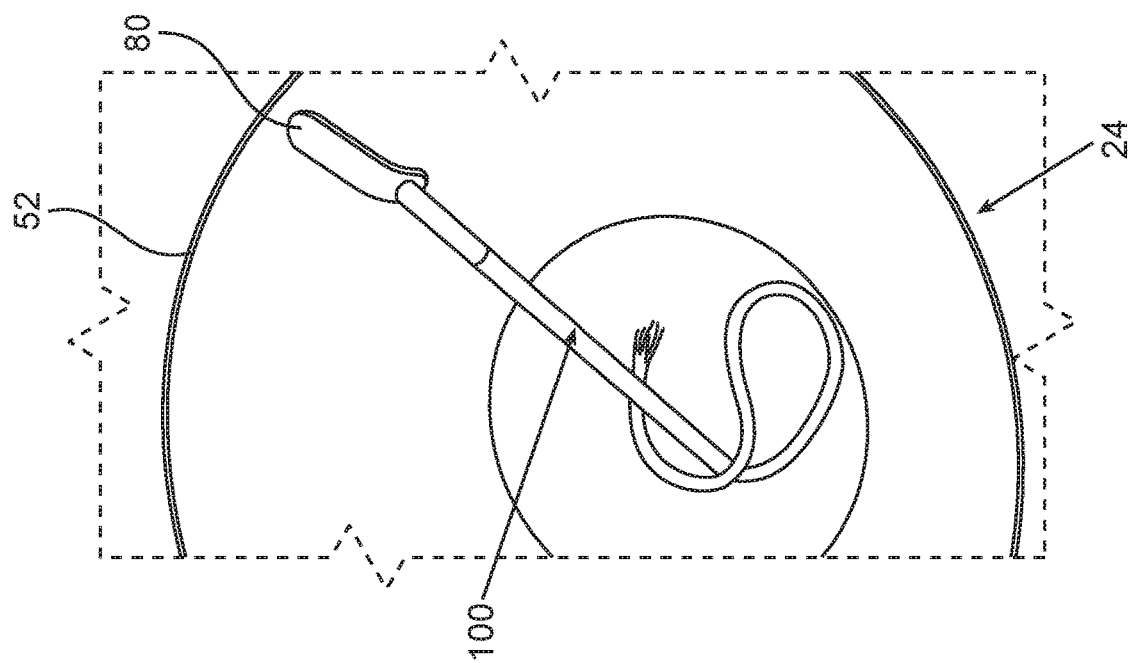
Figure 14C:
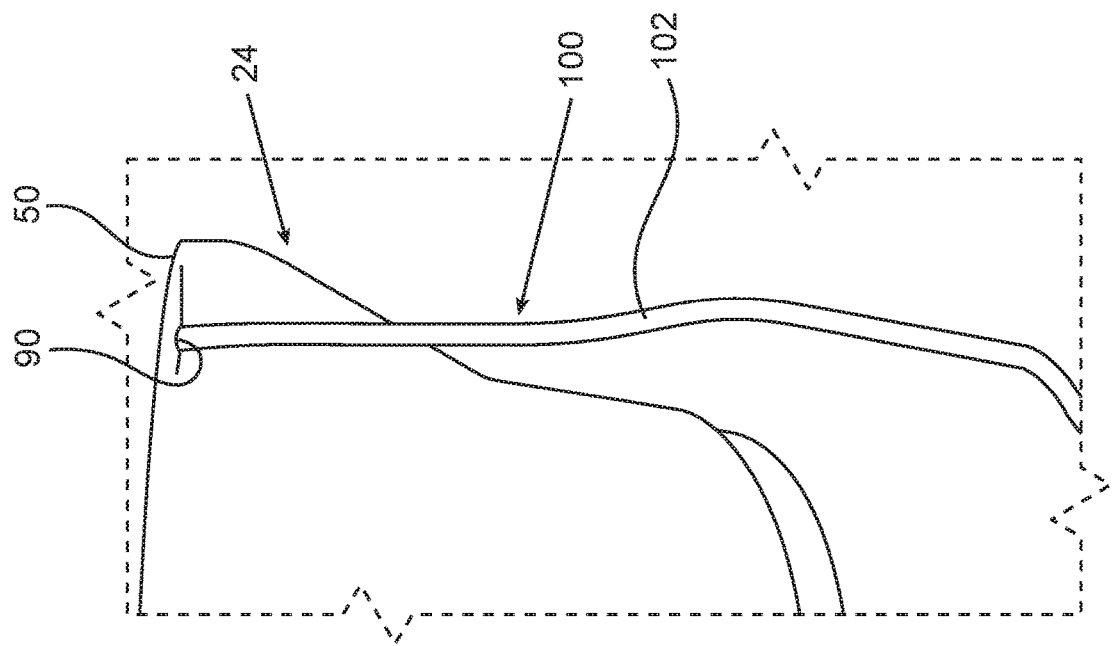
Figure 14B:
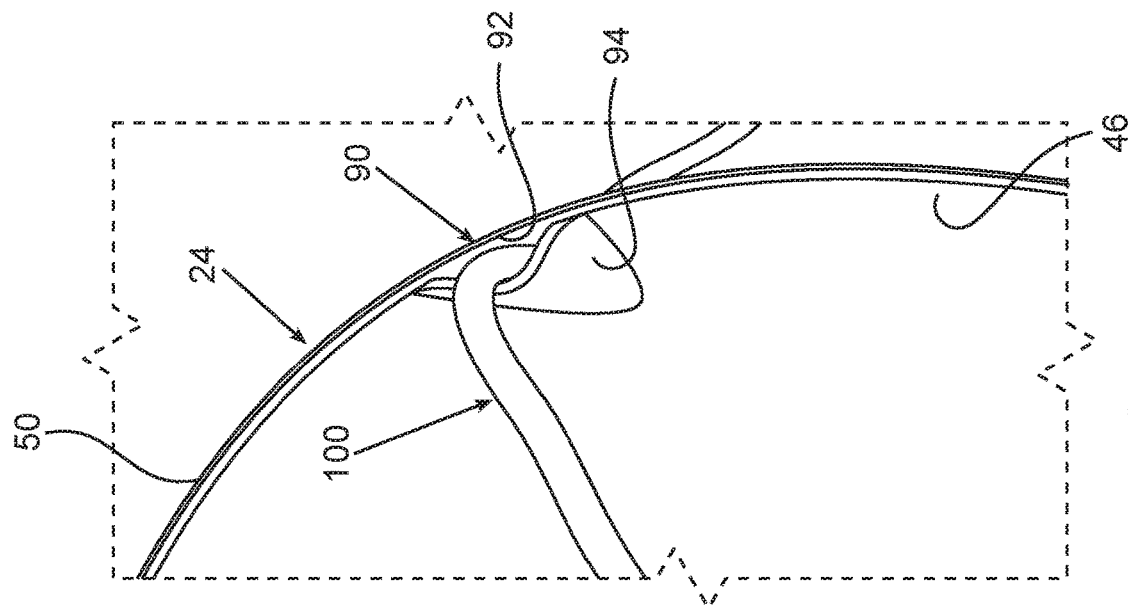

Yet an example of a capillary assembly holder is illustrated in Figs in FIGS. 14A to 14C. The capillary assembly holder generally designated 90 simply comprises a cut 92 at the side wall 46 of the pot liner, right below the top edge 50, with an inward indented portion 94.

A simplified example of a capillary assembly holder (not shown) is a mere indent at the top edge of the pot liner, with or without a capillary assembly fastener disposed at either one or both the outside surface of the inside surface of the pot liner.

Figure 8:
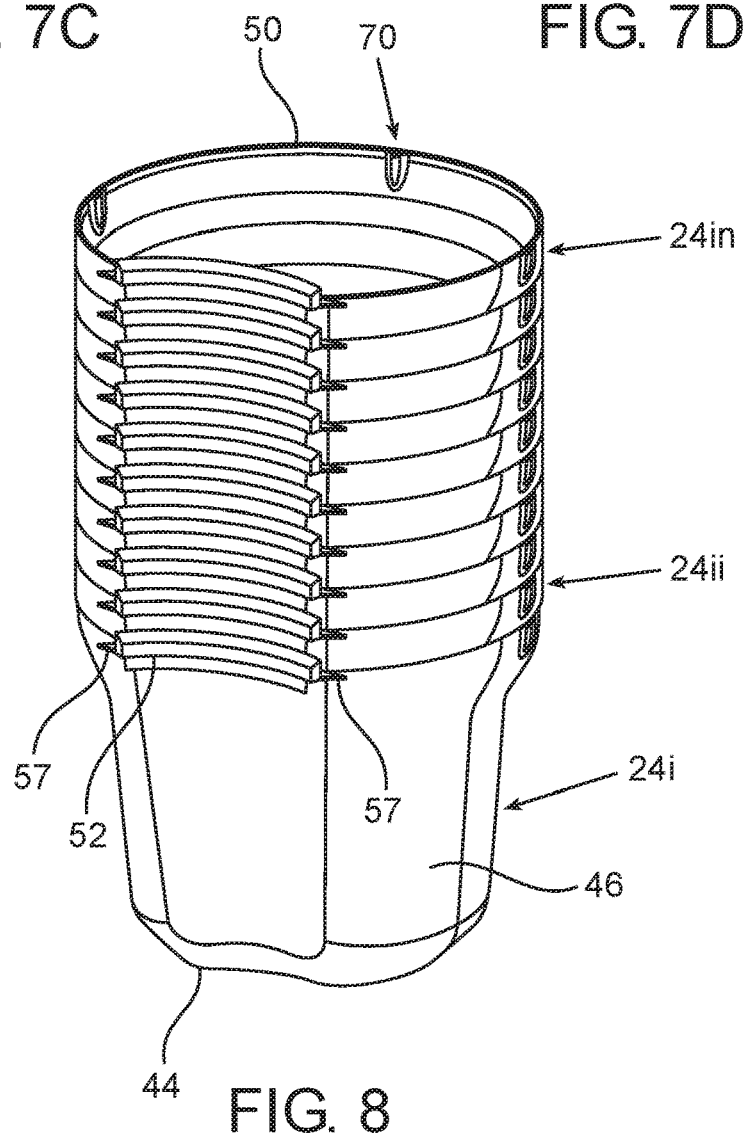
FIG. 8 is a perspective view illustrating a stack of nested pot liners according to the disclosure.

It is further appreciated. as illustrated in FIG. 8, that the pot liner 24 is shaped such that it can be nestable stacked within like pot liners $24_i$-$24_n$.

Turning now to FIGS. 11A to 11D there is illustrated an example wherein the retention member 52' is detachably attachable over the top edge 50 of a pot liner 24' (not integral with the retention member 52'), wherein the retention member 52' is curved in register with the curvature of the top portion of the pot liner, and comprises a slot 61 extending between an inside clamping wall $63_{in}$ and an outside clamping wall $63_{out}$, with a top shoulder 65 extending between platelets 55 and end edges 57, as discussed above. The arrangement is such that the retention member 52' can be applied over the top edge 50 of the pot liner, such that prior to assembly (FIG. 11C) it does not interfere with nesting-stacking of like pot liners. However, when assembled, as in FIG. 11D, the retention member 52' serves as discussed hereinabove as in connection with other examples and wherein the retention member 52' is inclined such that the top shoulder 65 extends substantially coplanar with the top edge 50 of the pot liner 24'.

Figure 9B:
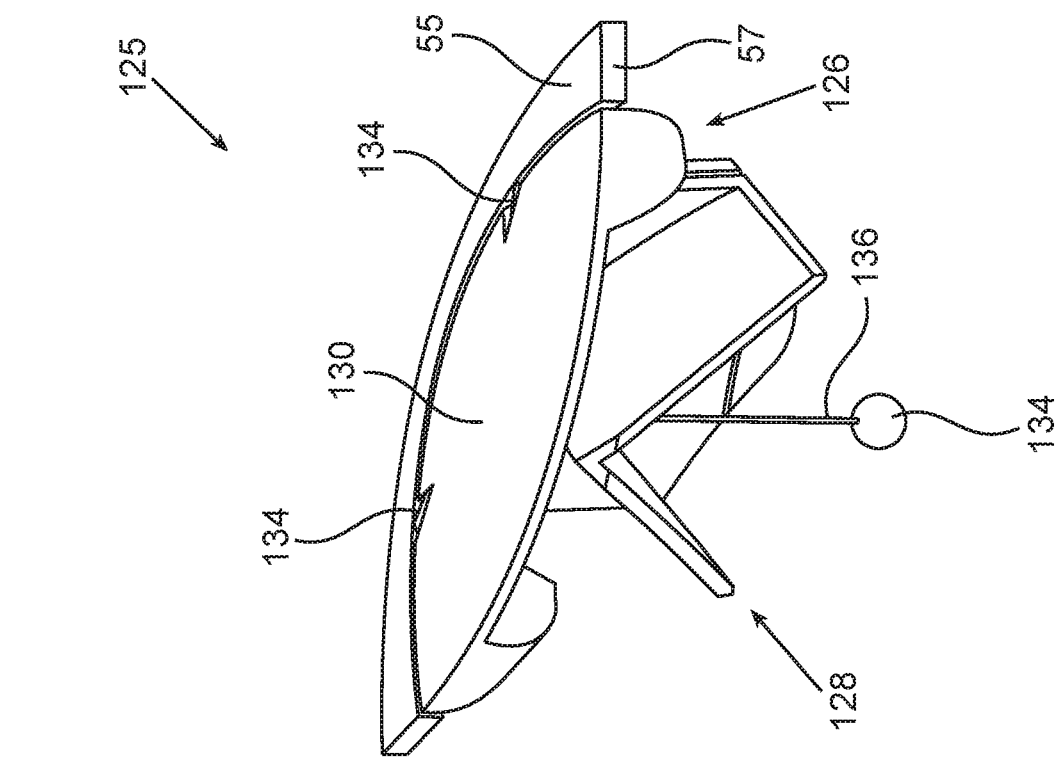
FIGS. 9A and 9B illustrate a reservoir lid fitted with an automatic liquid level indicator, at an open position and a closed position, respectively.
Figure 9A:
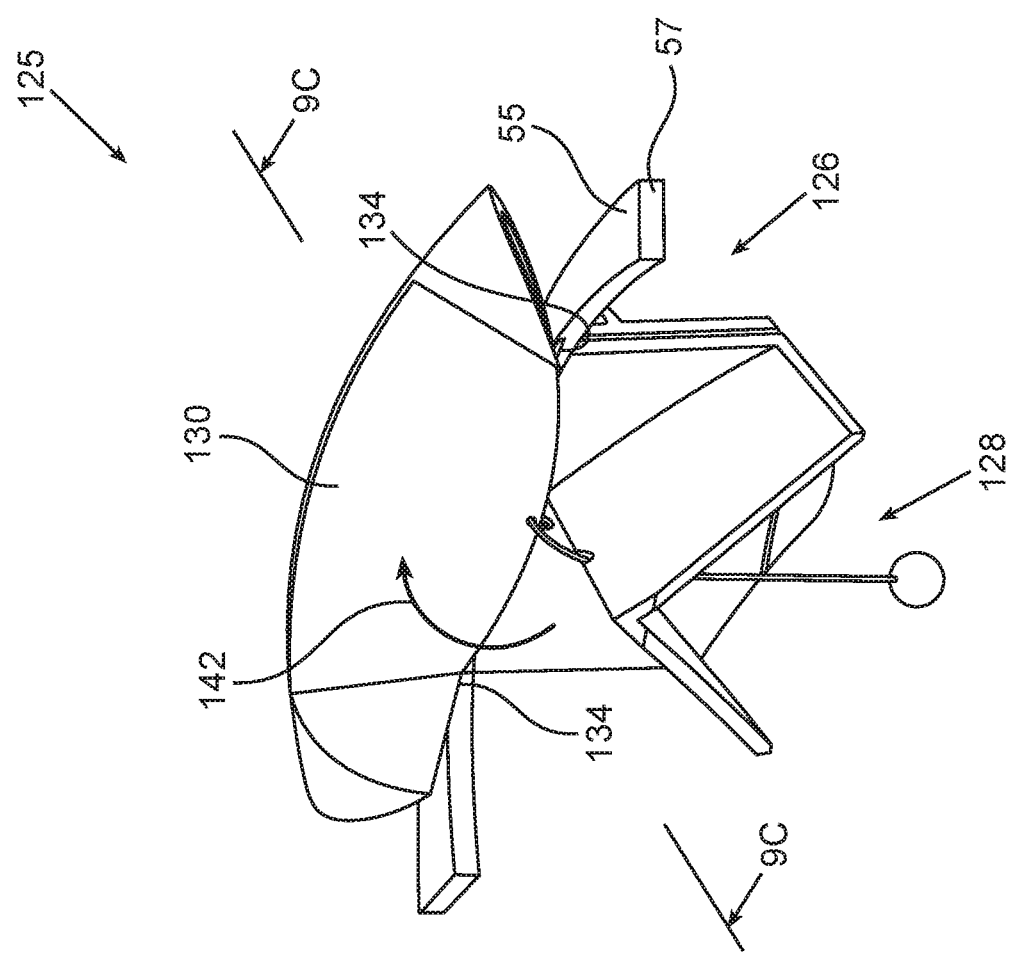

Further attention is now directed to FIGS. 9A to 9C of the drawings, directed to a subassembly of a retention member associated with an irrigation liquid level indicator, generally designated 125. The subassembly 125 comprises a retention member 126 configured as a detachable-attachable element, configured for mounting over a top edge of pot liner, as discussed hereinbefore in connection with FIGS. 11A to 11C, though it is appreciated that the subassembly 125 can just as well be integral with the pot liner. Whilst the retention member 126 is substantially similar with that disclosed in connection with FIGS. 11A and 11B, however it is further configured with an automatic liquid level indicator. The liquid level indicator generally designated 128 comprises a lid pivotally articulated at hinges 134 to the retention member 126, said lid having a shape complimentary of the indented portion of the liner. The lid 130 is pivotal between an open position (FIG. 9c) and a normally closed position (FIG. 9B), where at the closed position the lid extends substantially coplanar with the retention member 126 and as such, at this position, it covers the opening of the irrigation liquid filling duct (closed in FIG. 15; open in FIG. 16).

Figure 9E:
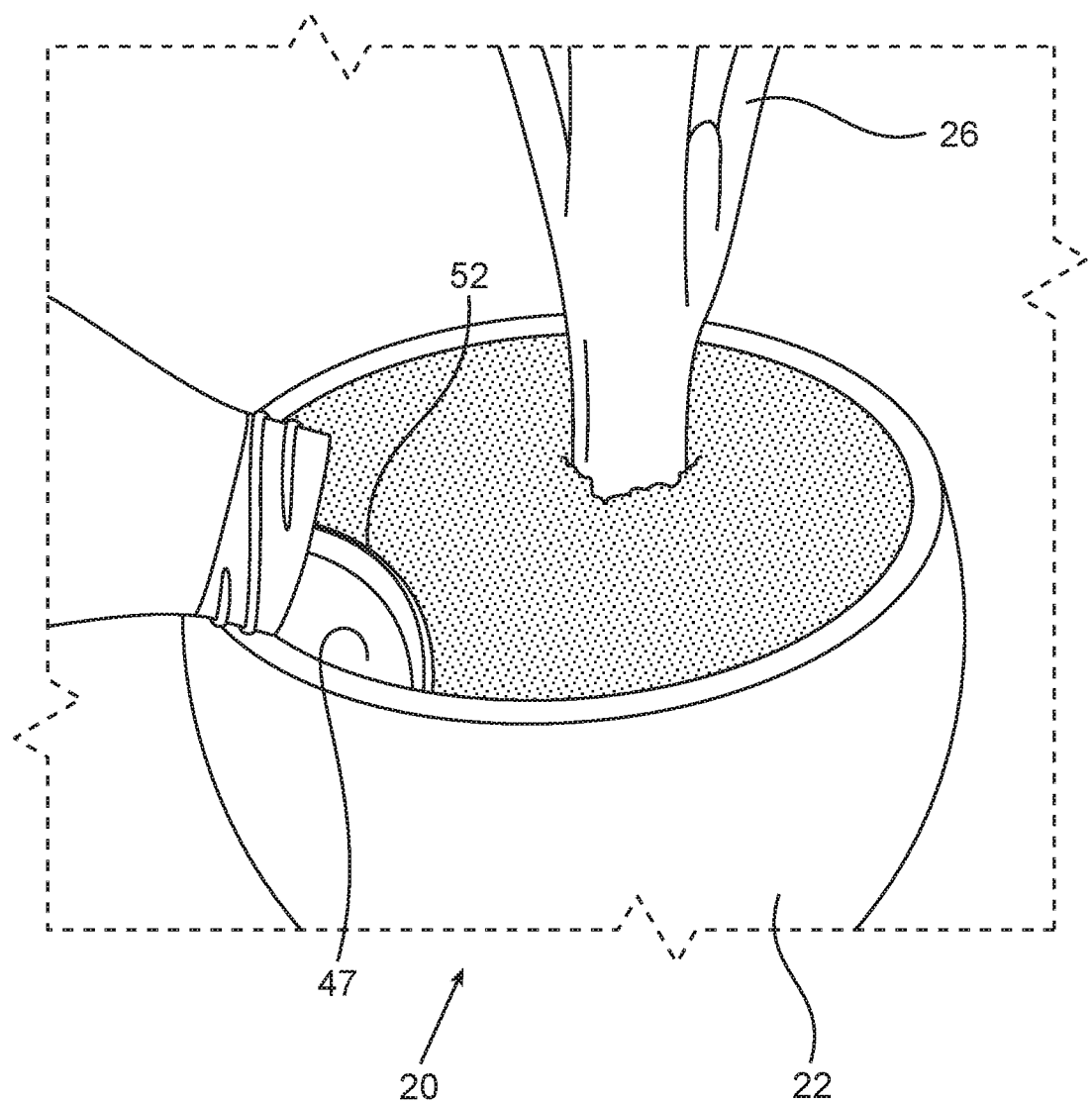
FIG. 9E illustrates irrigation liquid refilling.

The liquid level indicator 128 further comprises a buoy 134 suspended by cord 136 from a rear portion of the lid 130, i.e., behind the lid hinges 134. The cord 136 passes through a guiding port 138 (FIG. 9C) for confirming that the buoy 134 is freely displaceable within the well-like irrigation reservoir 47, and is sufficiently remote from the wall of the indented portion of the line, for avoiding friction therewith. The length of cord 136 is defined such that the lid 130 remains at the closed position as long as the buoy 134 does not drop below a minimal predetermined level within the irrigation liquid reservoir. Once liquid level within the reservoir drops below said minimal predetermined level, the buoy 134 displaces under gravity in direction of arrow 138 (FIG. 9C) and causing the lid 130 to displace into its open position (FIGS. 9A and 9C), said open lid serving as a visible indicator the refiling irrigation liquid is required, and also opens the irrigation liquid reservoir 47 for filling. It is appreciated that the bottom surface of the lid can be colored with an eye-attracting color. Accordingly, it is apparent that the lid 130 remains closed and will open only for filling the liquid reservoir 47 (as shown in FIG. 9E), thus minimizing liquid evaporation from the reservoir.

Figure 10B:
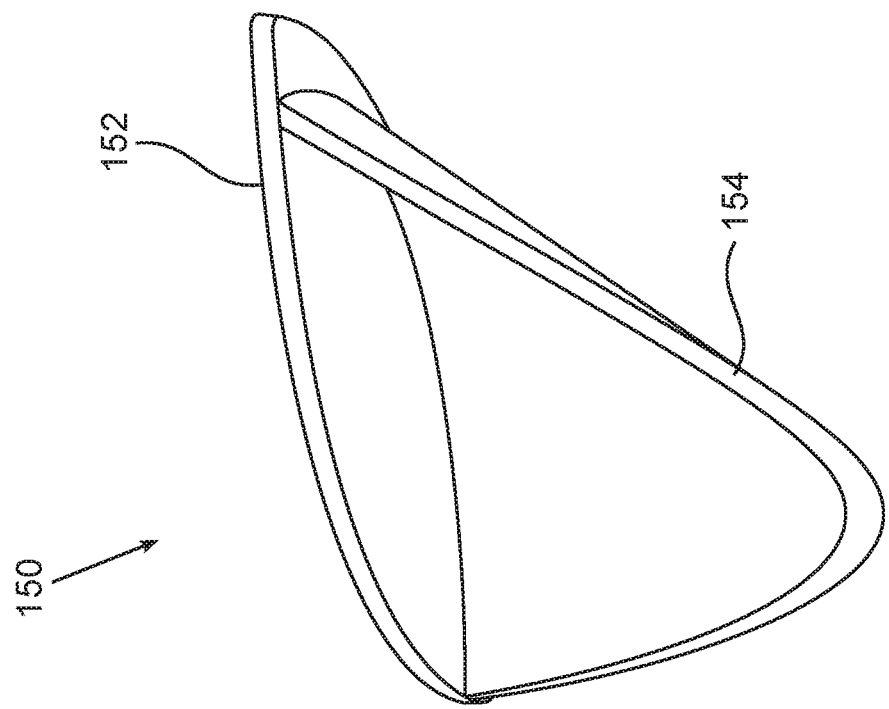
FIGS. 10A and 10B are a top perspective view and a bottom perspective view of a reservoir lid according to an example of the disclosure.
Figure 10A:
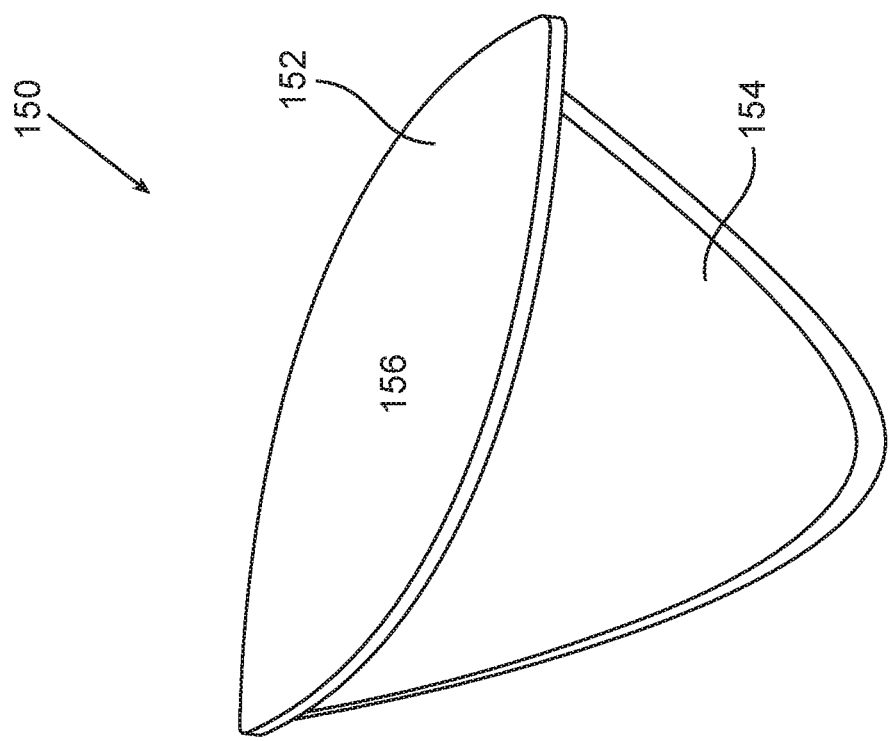
Figure 11A:
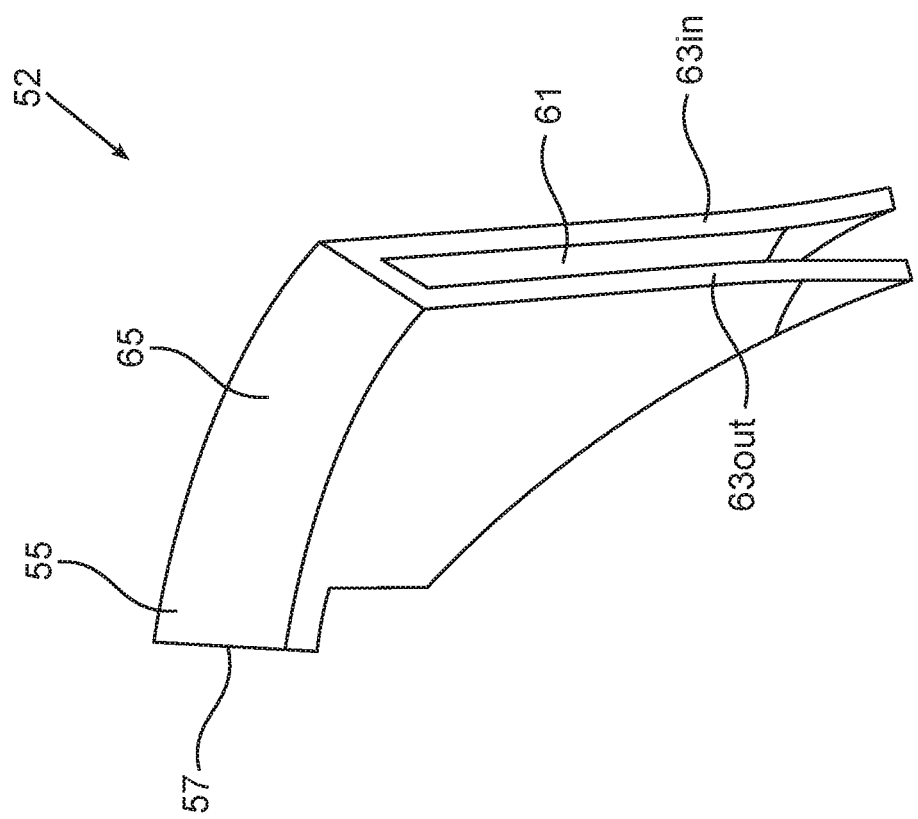
FIG. 11A is a top perspective view of a retention member according to an example of the disclosure.
Figure 11B:
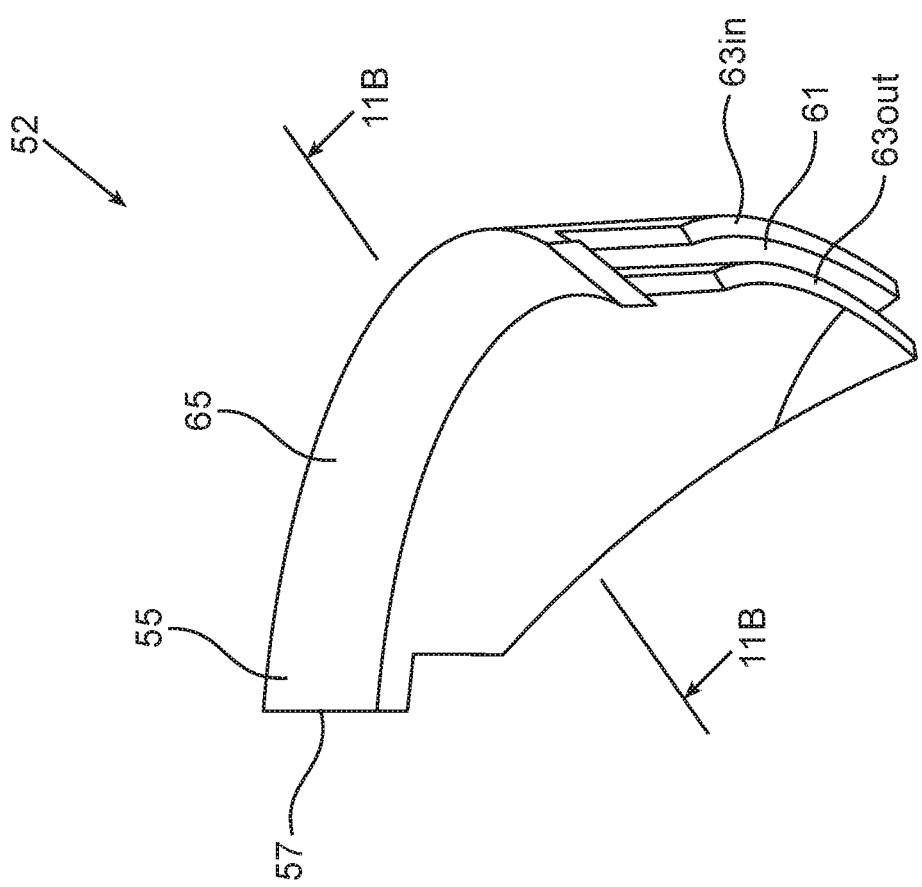
FIG. 11B is a section along line 11B-11B in FIG. 11A.
Figure 11D:
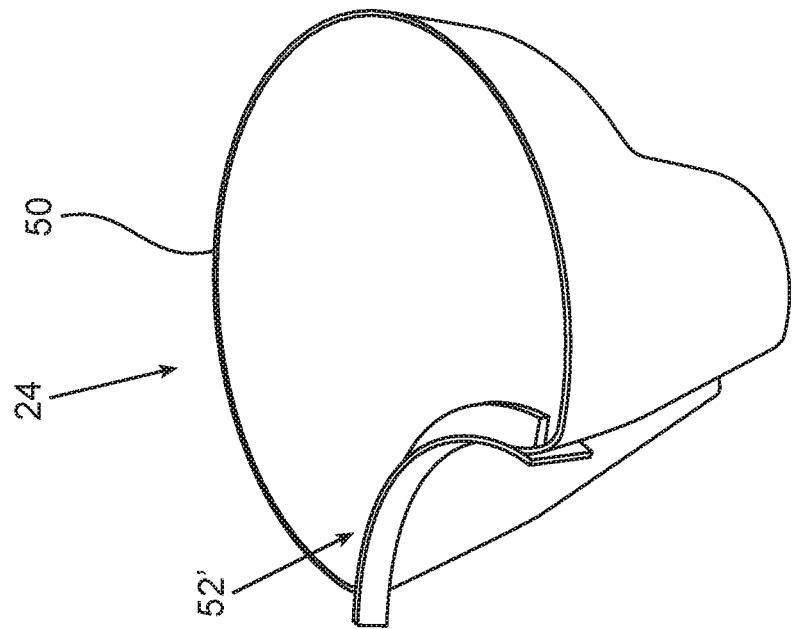
FIGS. 11C and 11D are an exploded view and an assembled view of the retention member of FIG. 11A and the pot liner, according to an example of the disclosure.
Figure 11C:
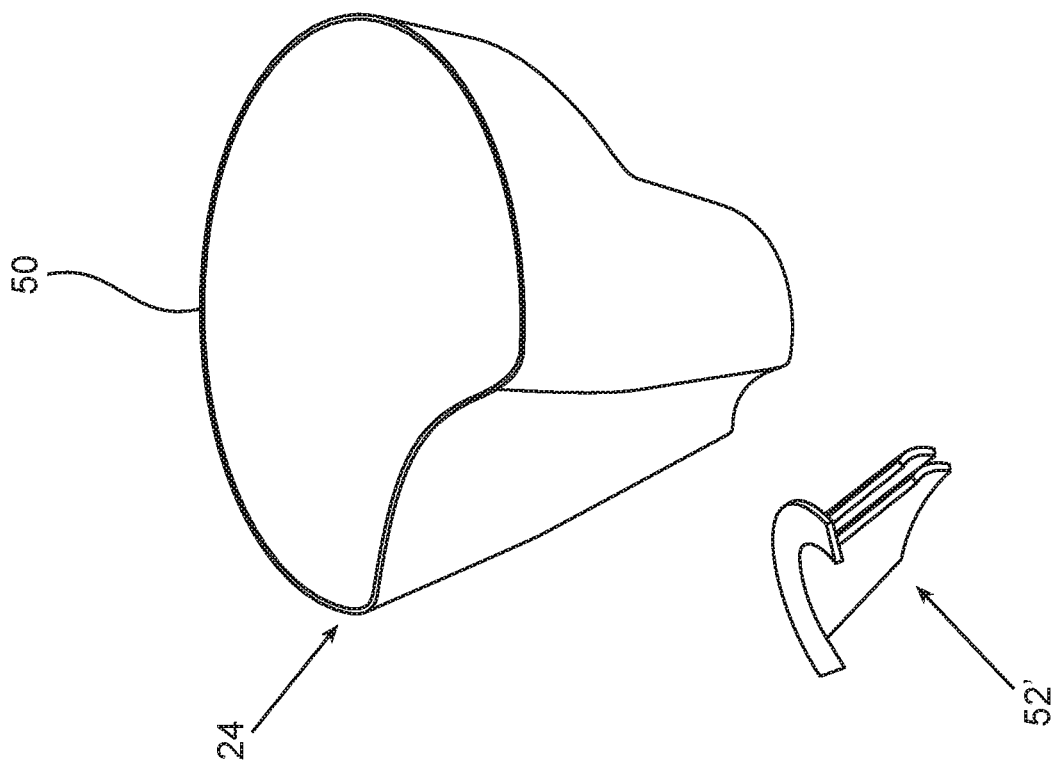
Figure 13A:
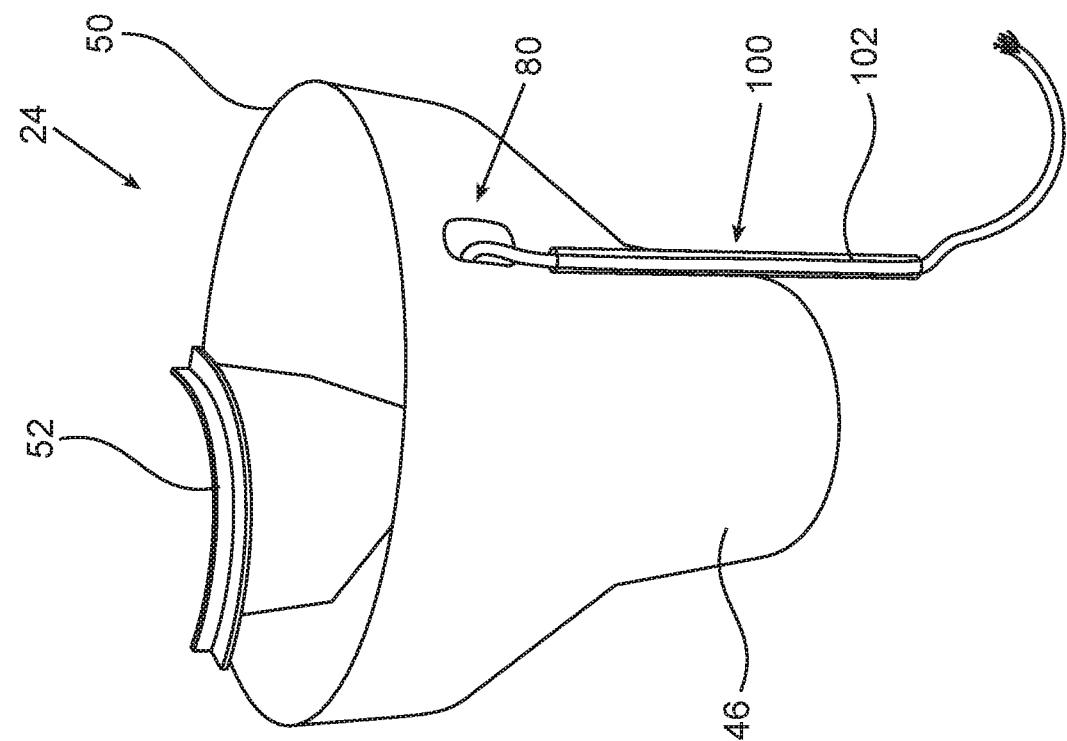
FIG. 13A to 13D are directed to another example of a pot liner, configured with a capillary assembly.

As an alternative to the liquid level indicator 128 configured with lid 130, the irrigation liquid reservoir 47 can be closed by a manually removable lid 150 (FIGS. 10A and 10B), said lid 150 comprising a closure portion 152 having a shape complimentary of the indented portion of the liner and configured for bearing over a shoulder of the retention member 52, and supporting stem portion 154 configured for bearing against the wall surface of the indented portion 94 of pot liner 24. When in position the top surface 156 of lid 150 is substantially flush with the top edge 50 of the pot liner 24 (and said surface can serve as an advertising surface).

Figure 12C:
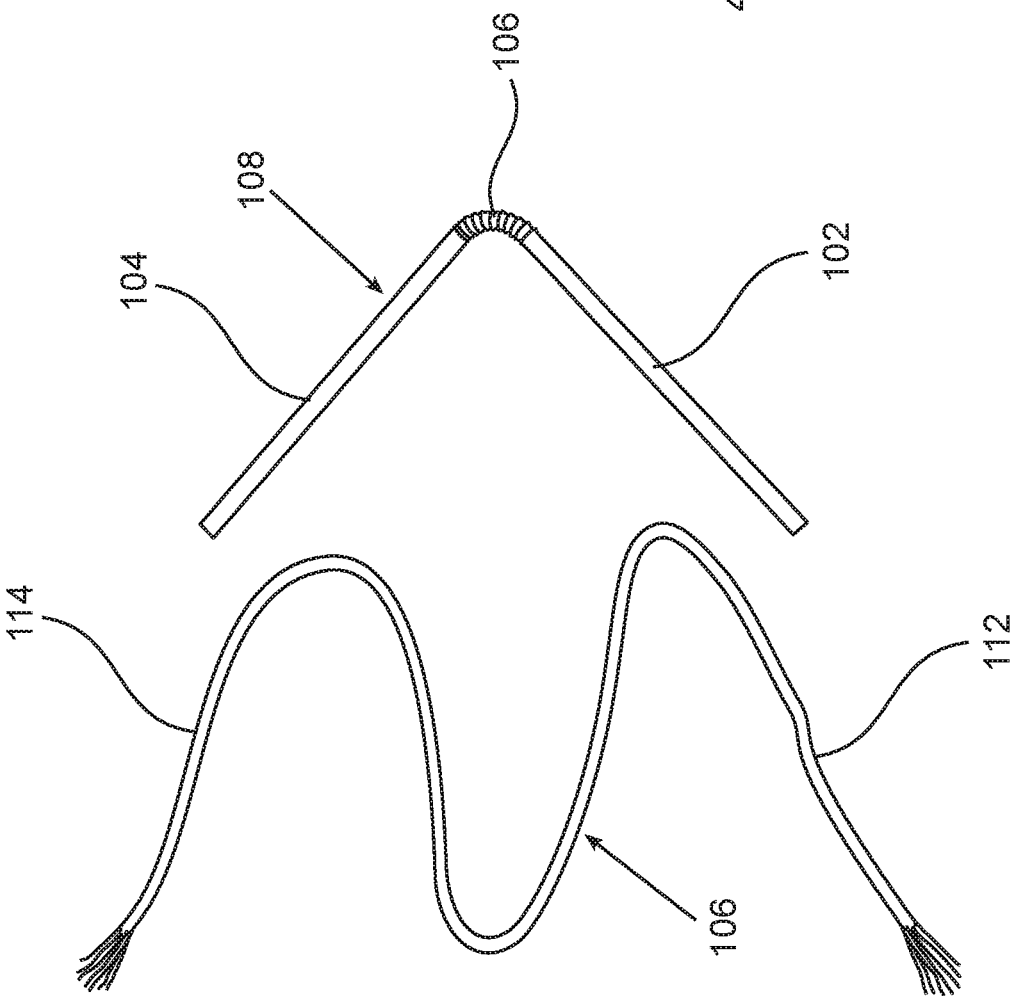
FIG. 12C is an exploded view of the capillary assembly of FIG. 12A.
Figure 13C:
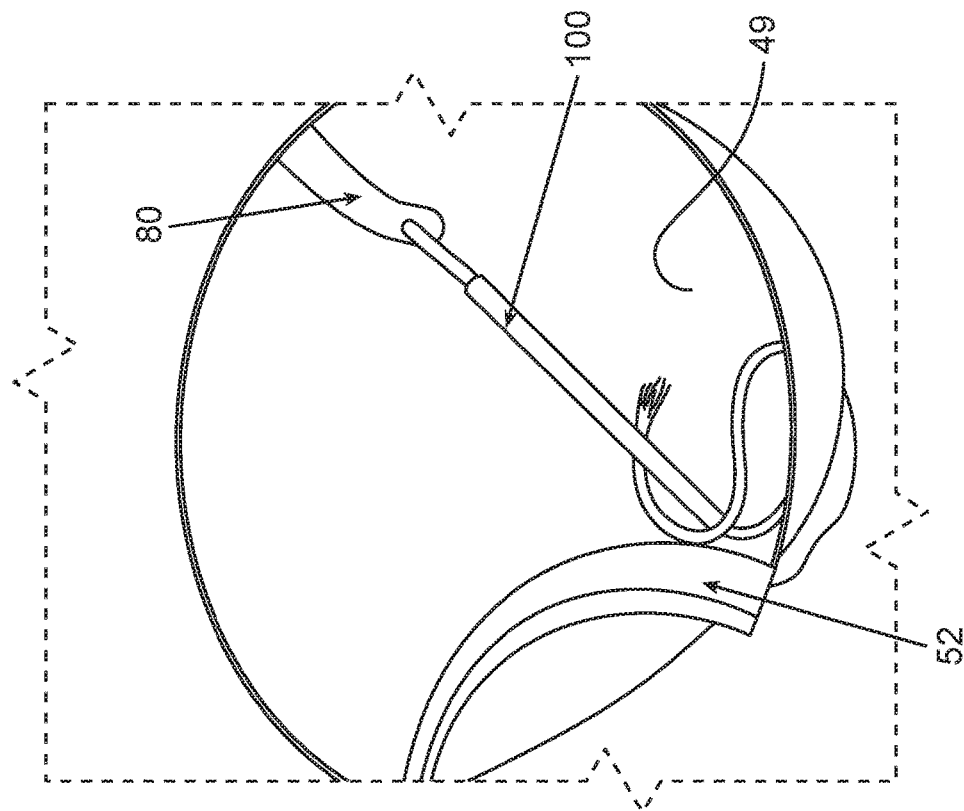
Figure 13B:
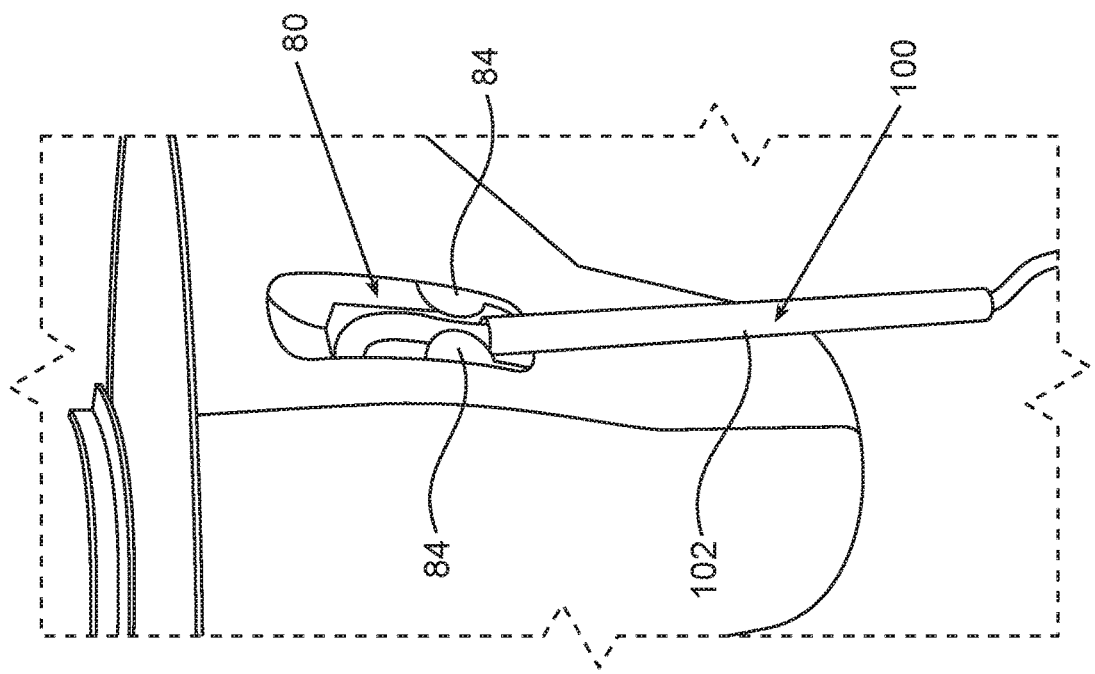

Turning now to FIGS. 12A to 12C reference is made to the capillary assembly generally designated 100, also seen in FIGS. 13 and 14. The capillary assembly 100 comprises a capillary media, which in the illustrated example is a multiple strand woven wick 106 and it is appreciated that the capillary media can be made of any sort of material, either organic or inorganic, uniform or not, comprising one or more strands, interwoven or not, and combinations thereof. The wick 106 is received within a liquid impermeable sheath 108 configured with a first (outside) portion 102 and a second (inside) portion 104, with an intermediate foldable portion 106, which in the illustrated example is a bellows-type foldable section. The purpose of the foldable portion is to ensure that at the event of folding the capillary assembly 100, even at an acute angle and even at 180°, a lumen of the sheath 108 remains open, so as to ensure free capillary liquid flow along the wick 106.

In use (FIGS. 2B and 9D), the capillary assembly 100 is positioned such that a first end 112 of the capillary wick 106 projects from the first (outside) portion 102 of the sheath 108, and a second end 114 of the capillary wick 106 projects from the second (inside) portion 102 of the sheath 108, wherein first end 112 of the capillary wick 106 is immersed at a bottom portion of the liquid reservoir 47, and second end 114 of the capillary wick 106 is disposed within the growing media 28 (soil) at the vicinity of a root base of a plant within the pot liner 24.

This arrangement, on the one hand, ensures that the plant receives ideal amount of irrigation as it may require and not more than necessary, and, on the other hand, substantially no evaporation takes place from the wick and from the reservoir.

Turning now to FIGS. 17A and 17B there are illustrated an embodiment of pot liners according to an example of the present disclosure, generally designated 120, nesting received within one another.

The pot liner differs from the pot liner of the previous example in several aspects. For example, the indented portion 222 is configured with an array of reinforcing ribs 228 for reinforcing the indented portion 222 on the one hand, and on the other hand, reinforcing articulation of the retention member 230.

Also noticed, the pot liner 220 is configured with one or more nesting stoppers/stacking ribs 234 radially projecting inwardly from an inside surface 236 of the pot liner 220, at a bottom portion thereof. At a bottom, outside portion of the pot liner 220 there are configured corresponding one or more nesting stopper indentions 238, wherein at a nested stacked/nested position the nesting stopper indentions 238 bear over a top edge 240 of the stacking ribs 234 (FIG. 17B). Accordingly, at the nested stacked/nested position the retention member 230 do not engage with one another, thereby preventing their deformation.

Figure 17C:
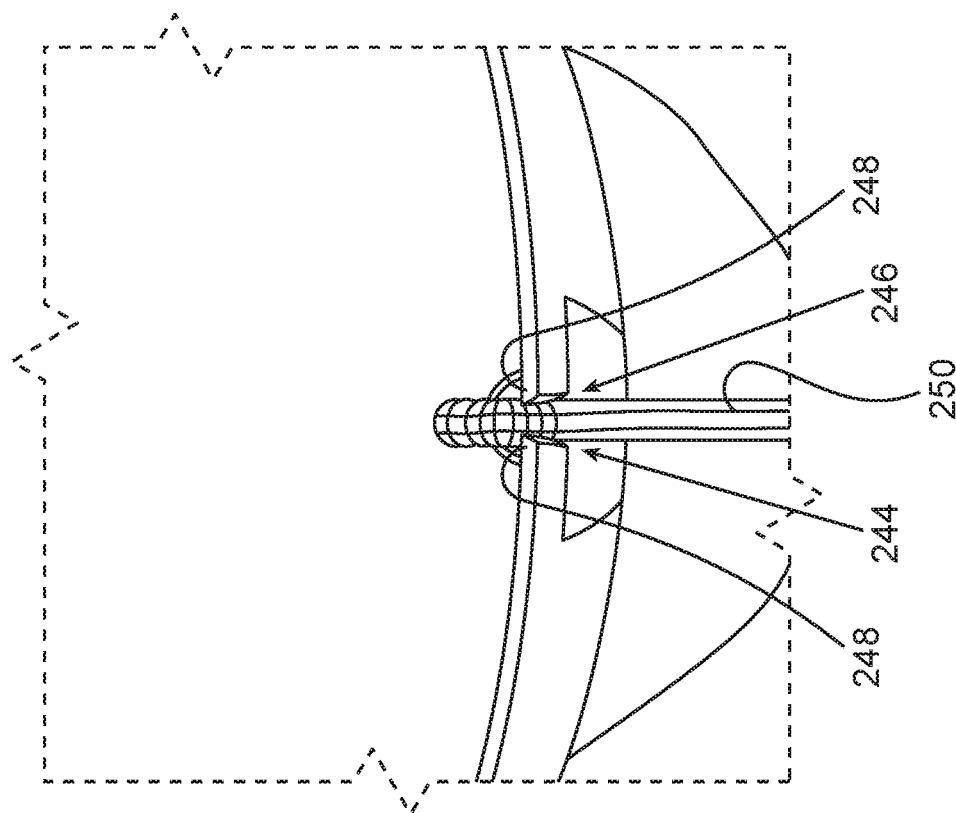
FIG. 17C is a top front perspective view of a pot liner, illustrating a capillary assembly holder according to the example of FIG. 17A, snappingly supporting a capillary assembly.

Further seen, in FIGS. 17A and 17C, the capillary assembly holder 244 is configured in the form of an indention 246 at the top edge of the pot liner 220 with two flaps facing each other, extending over said indention 246, whereby there is no need to thread a capillary assembly 250, but rather it can be simply snappingly engaged within the capillary assembly holder 244.

At an assembled position, when the pot liner is functionally received within the pot housing, there may reside forces on the pot liner, which may act in direction so as to pop-up the pot liner from the pot housing. Such forces can be a result of resiliency of the pot liner and the deformation applied to the pot liner when within the pot housing, as well as buoyancy forces of irrigation liquid within the pot housing. Accordingly, there are several solutions configured to prevent spontaneous pop-up of the pot liner.

Figure 18A:
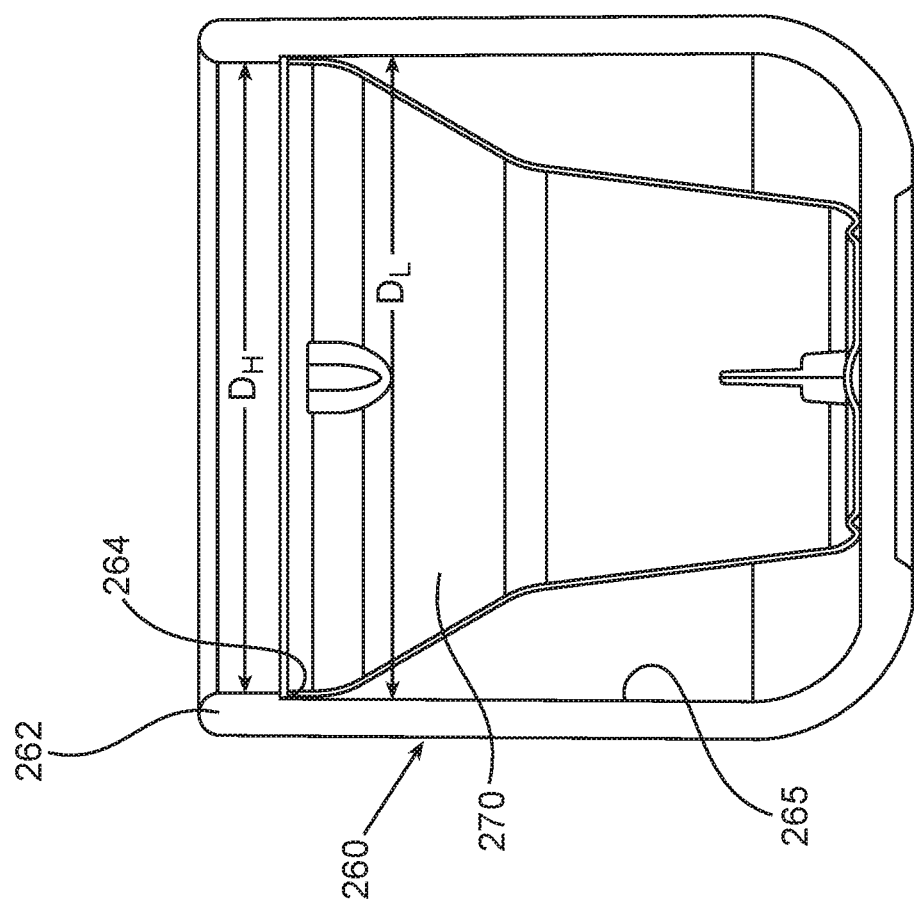
FIG. 18A is a sectioned view illustrating a pot liner received within a pot housing, according to an example of the disclosure.
Figure 18B:
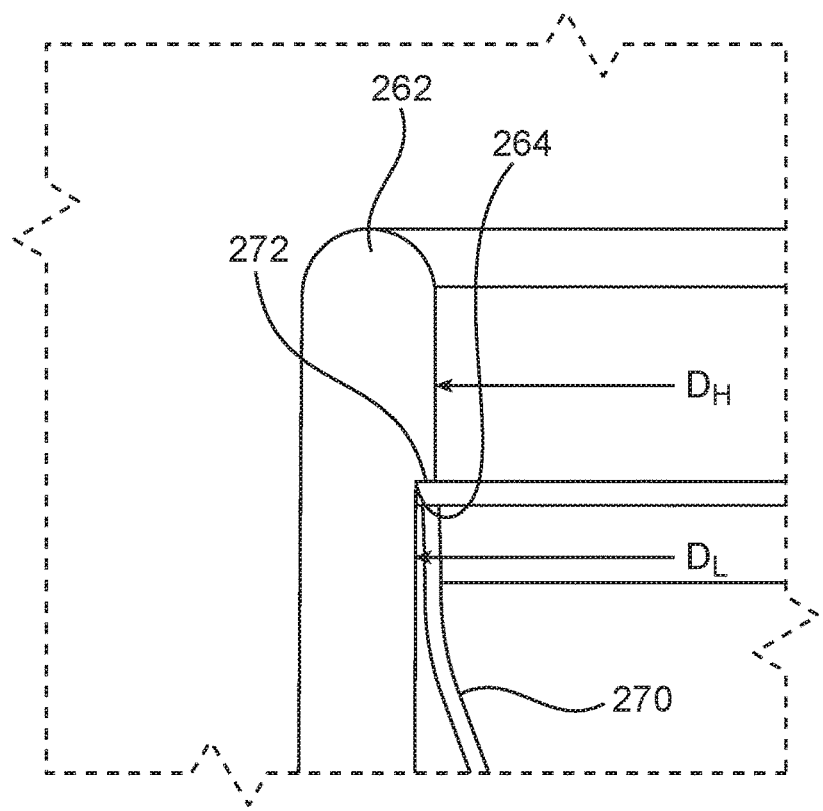
FIG. 18B is an enlargement of the portion marked 18B in FIG. 18A.

In FIGS. 18A and 18B there is illustrated a pot housing 260 according to an example of the disclosure, wherein at a top portion 262 there is an annular lip 264, facing inwardly, and having a diameter $D_H$ smaller than the maximum (top) diameter $D_L$ of the pot liner 270 (which in the example substantially corresponds with an inside diameter of the pot housing 260. The arrangement is such that at the assembled position the top edge 272 of the pot liner 270 bears under the annular lip 264 and against the inside wall surface 265 of the pot housing 260, wherein the pot liner 286 is barred from spontaneous pop-out from the pot housing.

Figure 18C:
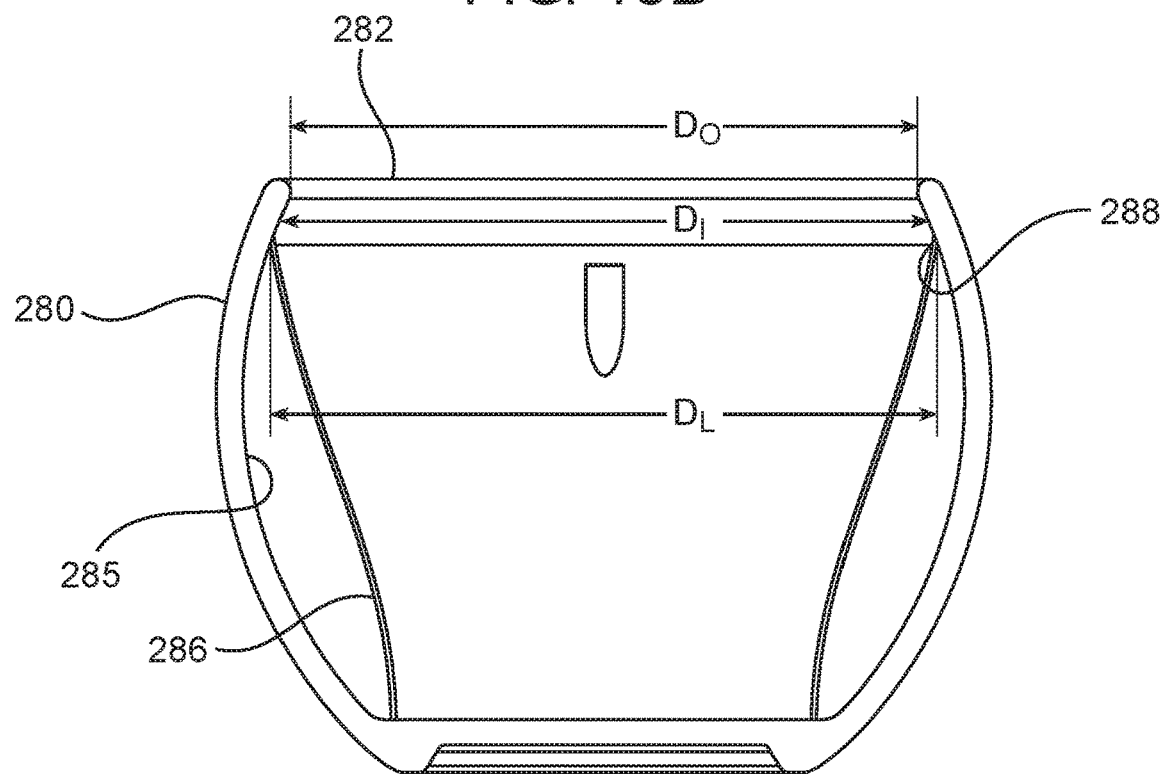
FIG. 18C is a sectioned view illustrating a pot liner received within a pot housing, according to yet an example of the disclosure.

In FIG. 18C there is illustrated a different example, wherein the pot housing 180 has a dome-shape section, with a top opening 182 having diameter $D_O$ smaller than a diameter $D_I$ and a top portion of the pot housing 180 below said opening 182, and wherein said diameter $D_O$ is smaller than the diameter maximum (top) diameter $D_L$ of the pot liner 186. The arrangement is such that at the assembled position the top edge 188 of the pot liner 186 bears against the inside wall surface 185 of the pot housing 180, below the opening 182, wherein the pot liner 186 is barred from spontaneous pop-out from the pot housing.

Any one of the following solutions, can be configured between the pot liner and the pot housing, for preventing spontaneous pop-up of the pot liner from the pot hosing:

a top rim of the pot liner is configured for biased bearing against an inward wall surface of the pot housing, below a top edge of the said pot housing;

the top pot liner rim can have a diameter greater than a diameter of top edge of the pot housing;

the pot housing can be configured at a top portion thereof with an inward projecting pot liner arresting arrangement, for prevent spontaneous pop-up of the pot liner;

the pot liner arresting arrangement can be an inward projection having a diameter suited for arresting a top rim of the pot liner;

the inward projection can be an annular rim or a series of projections;

the pot housing can have a dome-shape, with a top opening thereof having a narrower diameter with respect a lower body portion thereof;

the pot liner can be adhered within the pot housing.

The invention claimed is:

1. A capillary irrigation pot system, comprising:

a pot housing;

a pot liner configurable for receiving within said pot housing, wherein once received within the pot housing gives rise to an irrigation liquid reservoir extending between an inside wall surface of the pot housing and an outside wall surface of the pot liner; and a capillary assembly comprising a capillary media received within a substantially liquid impermeable sheathe, wherein a first end of the capillary media projecting from a first end of the sheath extends at a bottom portion of the irrigation liquid reservoir, and a second end of the capillary media projecting from a second end of the sheath extends within a bottom portion of the pot liner, and wherein an intermediate portion of the capillary assembly is configured to extend over a top portion of the pot liner, wherein the pot liner is made of a rigid though pliable material, said pot liner comprising a plant space defined by a perimetric side wall upwardly extending between a base and a top rim, with an inwardly indented portion at the side wall, wherein when the pot liner is placed within a liquid impermeable pot housing the top rim bears snug against a top inside wall surface of the pot housing, and wherein the pot liner comprises a retention member disposed at the top rim above the inwardly indented portion, said retention member is configured for retaining an indentation of the inwardly indented portion and applying pressure against the inside wall surface of the pot housing.

2. The capillary irrigation pot system according to claim 1, wherein at an operative, assembled position, a first end of the capillary media is disposed within the irrigation liquid at the irrigation liquid reservoir, and the second end of the capillary media is disposed at the vicinity of a root base of a plant within the pot liner.

3. The capillary irrigation pot system according to claim 1, wherein the pot housing is made of a liquid impermeable material, comprises a liquid impermeable liner, or is coated with a liquid impermeable material.

4. The capillary irrigation pot system according to claim 1, wherein when the pot liner is accommodated within a pot housing, at least a top rim of the pot liner snugly bears against an inside wall surface of the pot housing, apart for the inwardly indented portion, wherein an opening at the top of the inwardly indented portion, serves as an irrigation liquid refilling opening.

5. The capillary irrigation pot system according to claim 1, wherein the inwardly indented portion defines, together with a corresponding inside wall surface of a pot housing, the irrigation liquid reservoir.

6. The capillary irrigation pot system according to claim 1, wherein a top of the inwardly indented portion is closeable by a reservoir lid.

7. The capillary irrigation pot system according to claim 1, wherein a top edge of the pot liner, at the inwardly indented portion, is inwardly curved or substantially straight.

8. The capillary irrigation pot system according to claim 7, wherein the inwardly indented portion accommodates an irrigation liquid level indicator comprising a buoy suspended from a normally closed lid of the inwardly indented portion, whereby the lid is displaceable between its normally closed position when liquid within the reservoir is above a predetermined liquid level, and an open position at the event that liquid within the reservoir drops below said predetermined liquid level.

9. The capillary irrigation pot system according to claim 1, wherein the top portion of the pot liner is configured with at least one capillary assembly holder for securing the capillary assembly.

10. The capillary irrigation pot system according to claim 9, wherein the capillary assembly holder is configured at a top rim of the pot liner or a top portion of the pot liner.

11. The capillary irrigation pot system according to claim 1, wherein the sheath comprises a foldable portion configured to form a lumen of the sheath that remains open when the foldable portion is folded.

12. The capillary irrigation pot system according to claim 1, wherein the pot liner is nestably stackable within like pot liners.

13. The capillary irrigation pot system according to claim 1, wherein the pot liner is configured with a nesting stopper for restricting nesting extent of pot liners within one another.

14. The capillary irrigation pot system according to claim 1, wherein the pot liner is elastic and, once deformation force is applied to a top portion thereof, the pot liner is configured to be compressed and deformed, and also configured to be inserted into a pot housing, and upon ceasing the deformation force, the pot liner is configured to spontaneously regain its shape and bias against at least a top portion of the inside wall of the pot housing.

15. The capillary irrigation pot system according to claim 1, whereon at an assembled position the pot liner is fully positioned within the pot housing, with a top edge of the pot liner disposed below a top edge of the of housing.

16. A planting pot set, comprising:
   a pot housing of a nominal size and configured with a base and side walls upwardly extending therefrom;
   a pot liner of corresponding nominal size, rigid though pliable material, said pot liner comprising a plant space defined by a perimetric side wall upwardly extending between a base and a top rim, with an inwardly indented portion at the side wall, and at least one capillary assembly holder at a top portion of the pot liner, wherein when the pot liner is placed within the pot housing said top rim bears snug against a top inside wall surface of the pot housing, with an irrigation liquid reservoir extending between an inside wall surface of the pot housing and an outside wall surface of the pot liner; and
   at least one capillary assembly comprising a capillary media received within a substantially liquid impermeable sheathe, wherein a first end of the capillary media projecting from a first end of the sheath is placeable at a bottom portion of the irrigation liquid reservoir, and a second end of the capillary media projecting from a second end of the sheath is placeable within a bottom portion of the pot liner, and wherein an intermediate portion of the capillary assembly is configured to extend over a top portion of the pot liner and retainable by the capillary assembly holder,
   wherein the pot liner comprises a retention member disposed at the top rim above the inwardly indented portion, said retention member is configured for retaining an indentation of the inwardly indented portion and applying pressure against the inside wall surface of the pot housing.

17. The capillary irrigation pot system according to claim 1, wherein a diameter of a top rim of the pot liner is greater than a diameter of top opening of the pot housing.

18. The capillary irrigation pot system according to claim 1, wherein the pot housing is configured at a top portion thereof with an inward projecting pot liner arresting arrangement, for prevent spontaneous pop-up of the pot liner.

* * * * *